(12) United States Patent
Yang et al.

(10) Patent No.: US 12,170,583 B1
(45) Date of Patent: Dec. 17, 2024

(54) MANAGING COMMUNICATIONS FOR HOST DEVICES WHICH ARE PART OF A MULTI-HOST LINK AGGREGATION GROUP

(71) Applicant: Dell Products L.P., Round Rock, TX (US)

(72) Inventors: Jianfei Yang, Chengdu (CN); Weilan Pu, Chengdu (CN); Mingyi Luo, Chengdu (CN); Lifeng Zheng, Chengdu (CN); Si Zhang, Chengdu (CN); Srinivasa Raju Chamarthy, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/476,441

(22) Filed: Sep. 28, 2023

(51) Int. Cl.
| | |
|---|---|
| G06F 15/16 | (2006.01) |
| H04L 12/46 | (2006.01) |
| H04L 61/5007 | (2022.01) |
| H04L 67/1097 | (2022.01) |

(52) U.S. Cl.
CPC ...... H04L 12/4645 (2013.01); H04L 61/5007 (2022.05); H04L 67/1097 (2013.01)

(58) Field of Classification Search
CPC ............. H04L 12/4645; H04L 61/5007; H04L 67/1097
USPC ....................................................... 709/217
See application file for complete search history.

(56) References Cited

U.S. PATENT DOCUMENTS

| | | | | |
|---|---|---|---|---|
| 7,028,078 | B1 * | 4/2006 | Sharma | H04L 67/1097 711/148 |
| 7,447,197 | B2 * | 11/2008 | Terrell | H04L 67/1097 370/360 |
| 7,773,598 | B2 * | 8/2010 | Lindholm | H04L 12/4641 370/392 |
| 7,890,654 | B1 * | 2/2011 | Tadimeti | H04L 61/2535 370/399 |

(Continued)

OTHER PUBLICATIONS

Juniper Networks, "Example: Configuring an FCoE LAG on a Redundant Server Node Group," https://www.juniper.net/documentation/US/en/software/junos/storage/topics/example/fibre-channel-fcoe-lag-rsng.html, Feb. 18, 2021, 16 pages.

(Continued)

*Primary Examiner* — Moustafa M Meky
(74) *Attorney, Agent, or Firm* — Ryan, Mason & Lewis, LLP

(57) ABSTRACT

An apparatus comprises at least one processing device configured to receive, by at least one network switch, a communication comprising a virtual logical device tag. The processing device is also configured, responsive to determining that the virtual logical device tag is a host-specific virtual logical device tag associated with a given host-specific virtual logical device of a given host device that is part of a multi-host link aggregation bond, to direct the communication to a given link for the given host device. The processing device is further configured, responsive to determining that the virtual logical device tag is a service-generic virtual logical device tag for a service provided by host devices which are part of the multi-host link aggregation bond) collectively, to select one of the host devices in accordance with a distribution algorithm and to direct the communication to a selected link for the selected host device.

20 Claims, 22 Drawing Sheets

(56) References Cited

U.S. PATENT DOCUMENTS

| | | | | |
|---|---|---|---|---|
| 8,055,745 B2 * | 11/2011 | Atluri | G06F 11/1469 | 709/217 |
| 8,090,908 B1 * | 1/2012 | Bolen | H04L 67/1097 | 711/170 |
| 8,489,817 B2 * | 7/2013 | Flynn | G06F 12/0804 | 711/170 |
| 9,246,849 B2 * | 1/2016 | Rastogi | H04L 41/12 | |
| 9,461,911 B2 * | 10/2016 | Koganti | H04L 45/00 | |
| 9,733,868 B2 * | 8/2017 | Chandrasekaran | G06F 3/0689 | |
| 10,452,316 B2 * | 10/2019 | Lomelino | H04L 12/4633 | |
| 10,567,229 B2 * | 2/2020 | Pani | H04L 61/5007 | |
| 10,649,924 B2 * | 5/2020 | Dalal | G06F 13/1652 | |
| 10,873,639 B2 * | 12/2020 | Mardente | H04L 67/10 | |
| 10,942,666 B2 * | 3/2021 | Pydipaty | G06F 16/275 | |
| 11,018,898 B2 * | 5/2021 | Chu | H04L 43/16 | |
| 11,349,917 B2 * | 5/2022 | Jennings | H04L 69/16 | |
| 11,442,652 B1 * | 9/2022 | Dailey | H04L 67/1097 | |
| 11,481,362 B2 * | 10/2022 | Rantzau | G06F 11/1471 | |
| 11,575,577 B2 * | 2/2023 | MeLampy | H04L 41/0893 | |
| 11,743,232 B2 * | 8/2023 | Yeh | H04L 61/5007 | 709/224 |
| 11,811,555 B2 * | 11/2023 | Chu | H04L 69/22 | |

OTHER PUBLICATIONS

Juniper Networks, "Understanding FCoE," https://www.juniper.net/documentation/US/en/software/junos/storage/topics/concept/fibre-channel-fcoe-understanding.html, Feb. 18, 2021, 7 pages.

Juniper Networks, "Understanding FCoE LAGs," https://www.juniper.net/documentation/US/en/software/junos/storage/topics/concept/fcoe-lag-nic-teaming-understanding.html, Jan. 5, 2021, 6 pages.

Juniper Networks, "Storage User Guide," Jul. 7, 2023, 726 pages.

IEEE, "Standard for Local and Metropolitan Area Networks—Link Aggregation," https://1.ieee802.org/tsn/802-1ax-rev/, Accessed Sep. 14, 2023, 7 pages.

IEEE, "Amendment to Carrier Sense Multiple Access with Collision Detection (CSMA/CD) Access Method and Physical Layer Specifications-Aggregation of Multiple Link Segments," IEEE Std 802.3ad-2000, Mar. 30, 2020, 183 pages.

Dell Technologies, "Dell PowerScale OneFS Operating System," H8202.16 White Paper, Jan. 2023, 17 pages.

U.S. Appl. No. 18/308,600 filed in the name of Jianfei Yang et al. on Apr. 27, 2023, and entitled "Multi-Host Link Aggregation for Active-Active Cluster".

* cited by examiner

| CUSTOMIZED DISTRIBUTION ALGORITHM | |
|---|---|
| Pre-Condition | An array for mapping the existing VLAN IDs and Port Conversation IDs should be created. The length of this array is 4096 (the range of VLAN), and indexed by VLAN ID, where each entry is a Port Conversation ID that maps to the VLAN ID. If no Conversation ID is mapped to a VLAN ID, the value is set to -1. The time cost to identify the Conversation ID for a specified VLAN ID is always O(1). |
| Input: conversation_frame | The Conversation Frame |
| Input: vlan_port_conv_map | An array for mapping the existing VLAN IDs and Port Conversation IDs |
| 1: | Parse the conversation frame |
| 2: | Get the source and destination MAC address from frame head |
| 3: | Get the source and destination IP address from frame head |
| 4: | Get the VLAN ID from the frame head |
| 5: | Get the source and destination port from frame head |
| 6: | port_conv_id = vlan_port_conv_map[vlan_id] |
| 7: | If port_conv_id is -1: |
| 8: |    # Use default xmit hash policy |
| 9: |    port_conv_id = xmit_hash() |
| 10: | End If |
| Output: port_conv_id | The Port Conversation ID for this frame |

| HOST_H1 LINK CONFIGURATION ||
|---|---|
| STATIC BOND | LOCAL bond0 BASED ON LOCAL LINKS WITH AggrMAC |
| H1 VLAN DEVICE | VLAN DEV BASED ON bond0 WITH TAG H1 |
| S VLAN DEVICE | VLAN DEV BASED ON bond0 WITH TAG S |
| HOST_H1 IP CONFIGURATION ||
| H1 LOCAL IP IP_h1 | HOST_H1 LOCAL IP IP_H1 ON H1 VLAN DEV |
| SERVICE IP SIP | CLUSTER SERVICE IP ON S VLAN DEVICE |

| HOST_H2 LINK CONFIGURATION ||
|---|---|
| STATIC BOND | LOCAL bond0 BASED ON LOCAL LINKS WITH AggrMAC |
| H2 VLAN DEVICE | VLAN DEV BASED ON bond0 WITH TAG H2 |
| S VLAN DEVICE | VLAN DEV BASED ON bond0 WITH TAG S |
| HOST_H2 IP CONFIGURATION ||
| H2 LOCAL IP IP_h2 | HOST_H2 LOCAL IP IP_H2 ON H2 VLAN DEV |
| SERVICE IP SIP | CLUSTER SERVICE IP ON S VLAN DEVICE |

⋮

| HOST_Hh LINK CONFIGURATION ||
|---|---|
| STATIC BOND | LOCAL bond0 BASED ON LOCAL LINKS WITH AggrMAC |
| Hh VLAN DEVICE | VLAN DEV BASED ON bond0 WITH TAG Hh |
| S VLAN DEVICE | VLAN DEV BASED ON bond0 WITH TAG S |
| HOST_Hh IP CONFIGURATION ||
| Hh LOCAL IP IP_Hh | HOST_Hh LOCAL IP IP_Hh ON Hh VLAN DEV |
| SERVICE IP SIP | CLUSTER SERVICE IP ON S VLAN DEVICE |

FIG. 14B

MANAGING COMMUNICATIONS FOR HOST DEVICES WHICH ARE PART OF A MULTI-HOST LINK AGGREGATION GROUP

BACKGROUND

Information processing systems often include distributed arrangements of multiple nodes, also referred to herein as distributed processing systems. Such systems can include, for example, distributed storage systems comprising multiple storage nodes. These distributed storage systems are often dynamically reconfigurable under software control in order to adapt the number and type of storage nodes and the corresponding system storage capacity as needed, in an arrangement commonly referred to as a software-defined storage system. For example, in a typical software-defined storage system, storage capacities of multiple distributed storage nodes are pooled together into one or more storage pools. Data within the system is partitioned, striped, and replicated across the distributed storage nodes. For a storage administrator, the software-defined storage system provides a logical view of a given dynamic storage pool that can be expanded or contracted at case, with simplicity, flexibility, and different performance characteristics. For applications running on a host device that utilizes the software-defined storage system, such a storage system provides a logical storage object view to allow a given application to store and access data, without the application being aware that the data is being dynamically distributed among different storage nodes potentially at different sites.

SUMMARY

Illustrative embodiments of the present disclosure provide techniques for managing communications for host devices which are part of a multi-host link aggregation group.

In one embodiment, an apparatus comprises at least one processing device comprising a processor coupled to a memory. The at least one processing device is configured to receive, by at least one network switch, a communication comprising a virtual logical device tag. The at least one processing device is also configured to determine, at the at least one network switch, whether the virtual logical device tag is (i) a host-specific virtual logical device tag associated with a given host-specific virtual logical device of a given one of a plurality of host devices that are part of a multi-host link aggregation bond or (ii) a service-generic virtual logical device tag associated with a service-generic virtual logical device for a service provided by the plurality of host devices which are part of the multi-host link aggregation bond collectively. The at least one processing device is further configured, responsive to determining that the virtual logical device tag is the host-specific virtual logical device tag associated with the given host-specific virtual logical device of the given host device that is part of the multi-host link aggregation bond, to direct the communication to a given link between the at least one network switch and the given host device. The at least one processing device is further configured, responsive to determining that the virtual logical device tag is the service-generic virtual logical device tag associated with the service-generic virtual logical device for the service provided by the plurality of host devices which are part of the multi-host link aggregation bond collectively, to select one of the plurality of host devices in accordance with a distribution algorithm and to direct the communication to a selected link between the at least one network switch and the selected one of the plurality of host devices.

These and other illustrative embodiments include, without limitation, methods, apparatus, networks, systems and processor-readable storage media.

BRIEF DESCRIPTION OF THE DRAWINGS

FIG. 13 shows pseudocode for a customized link distribution algorithm for distributing network frames among a cluster of host devices which are part of a multi-host link aggregation bond in an illustrative embodiment.

FIGS. 14A and 14B show a process flow for building neighbor relationships between a virtual local area network logical device service gateway and a service Internet Protocol address in a system including a cluster of host devices which are part of a multi-host link aggregation bond in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
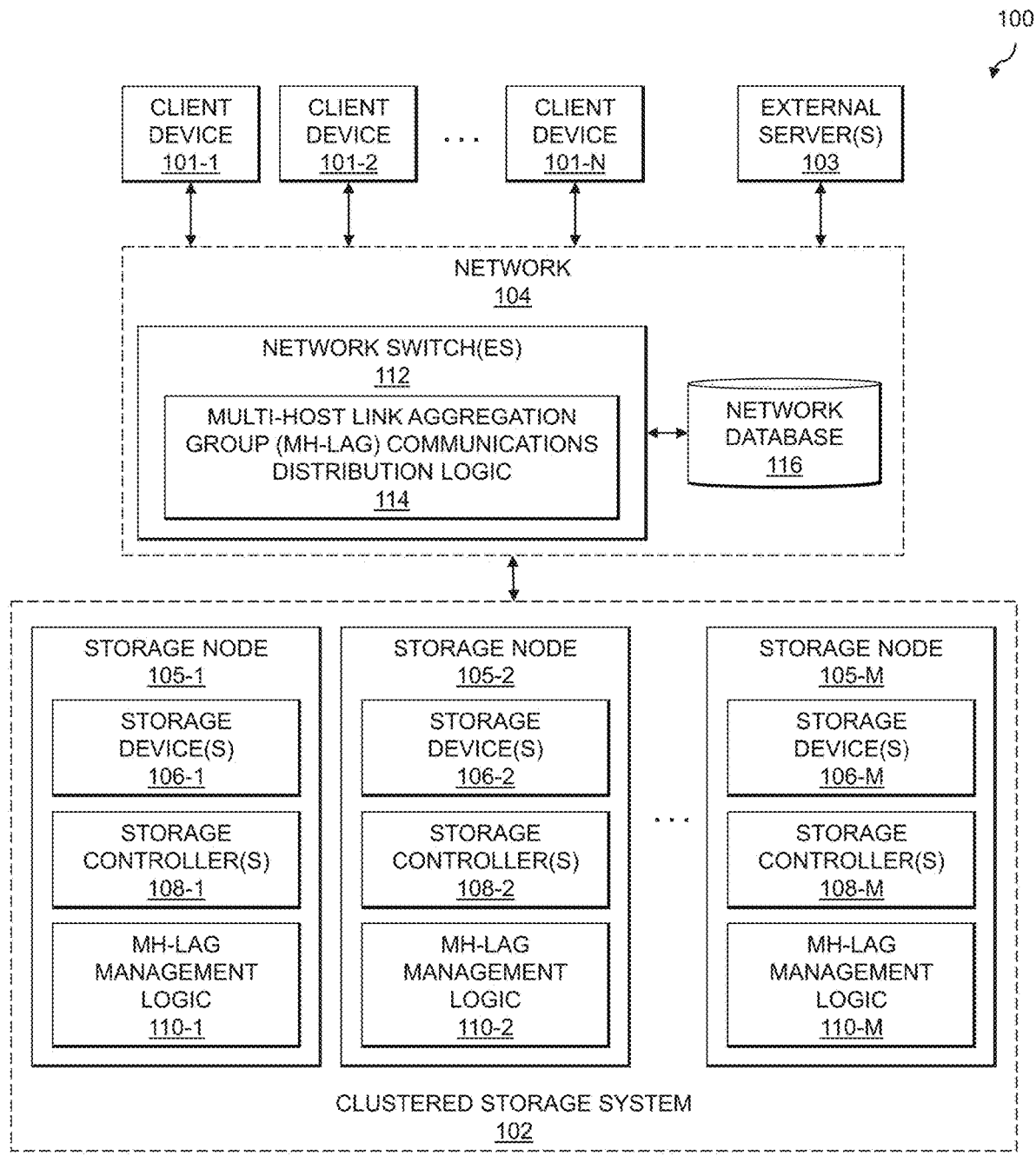
FIG. 1 is a block diagram of an information processing system configured for managing communications for host devices which are part of a multi-host link aggregation group in an illustrative embodiment.

FIG. 1 shows an information processing system 100 configured in accordance with an illustrative embodiment. The information processing system 100 comprises a plurality of client devices 101-1, 101-2, . . . 101-N(collectively, client devices 101), a clustered storage system 102 and one or more external servers 103. The clustered storage system 102 is an example of what is more generally referred to herein as a distributed storage system or more generally a distributed processing system, which may include a combination of one or more compute and storage nodes. The client devices 101, the clustered storage system 102 and external servers 103 are configured to communicate with one another via a network 104 that illustratively utilizes protocols such as Transmission Control Protocol (TCP) and/or Internet Protocol (IP), and may therefore be referred to herein as a TCP/IP network, although it is to be appreciated that the network 104 can operate using additional or alternative protocols. In some embodiments, the network 104 comprises a storage area network (SAN) that includes one or more Fibre Channel (FC) switches, Ethernet switches or other types of switch fabrics. As shown in FIG. 1, the network 104 comprises one or more network switches 112 (also referred to herein as network devices, or network switch devices).

The clustered storage system 102 more particularly comprises a plurality of storage nodes 105-1, 105-2 . . . 105-M (collectively, storage nodes 105). The values N and M in this embodiment denote arbitrary integer values that in the figure are illustrated as being greater than or equal to three, although other values such as N=1, N=2, M=1 or M=2 can be used in other embodiments. Similarly, the values C, S, h, n used in other embodiments denote arbitrary integer values.

The storage nodes 105 collectively form the clustered storage system 102, which is just one possible example of what is generally referred to herein as a "distributed storage system." Other distributed storage systems can include different numbers and arrangements of storage nodes, and possibly one or more additional components. For example, as indicated above, a distributed storage system in some embodiments may include only first and second storage nodes, corresponding to an M=2 embodiment. Some embodiments can configure a distributed storage system to include additional components in the form of a system manager implemented using one or more additional nodes.

In some embodiments, the clustered storage system 102 provides a logical address space that is divided among the storage nodes 105, such that different ones of the storage nodes 105 store the data for respective different portions of the logical address space. Accordingly, in these and other similar distributed storage system arrangements, different ones of the storage nodes 105 have responsibility for different portions of the logical address space. For a given logical storage volume, logical blocks of that logical storage volume are illustratively distributed across the storage nodes 105.

Other types of distributed storage systems can be used in other embodiments. For example, the clustered storage system 102 can comprise multiple distinct storage arrays, such as a production storage array and a backup storage array, possibly deployed at different locations. Accordingly, in some embodiments, one or more of the storage nodes 105 may each be viewed as comprising at least a portion of a separate storage array with its own logical address space. Alternatively, the storage nodes 105 can be viewed as collectively comprising one or more storage arrays. The term "storage node" as used herein is therefore intended to be broadly construed.

In some embodiments, the clustered storage system 102 comprises a software-defined storage system and the storage nodes 105 comprise respective software-defined storage server nodes of the software-defined storage system, such nodes also being referred to herein as SDS server nodes, where SDS denotes software-defined storage. Accordingly, the number and types of storage nodes 105 can be dynamically expanded or contracted under software control in some embodiments.

The client devices 101 illustratively comprise servers or other types of computers of an enterprise computer system, cloud-based computer system or other arrangement of multiple compute nodes associated with respective users.

The client devices 101 in some embodiments illustratively provide compute services such as execution of one or more applications on behalf of each of one or more users associated with respective ones of the client devices 101. Such applications illustratively generate input-output (IO) operations that are processed by the storage nodes 105. The term "input-output" as used herein refers to at least one of input and output. For example, IO operations may comprise write requests and/or read requests directed to logical addresses of a particular logical storage volume of one or more of the storage nodes 105. These and other types of IO operations are also generally referred to herein as IO requests.

The storage nodes 105 illustratively comprise respective processing devices of one or more processing platforms. For example, the storage nodes 105 can each comprise one or more processing devices each having a processor and a memory, possibly implementing virtual machines and/or containers, although numerous other configurations are possible.

The storage nodes 105 can additionally or alternatively be part of cloud infrastructure, such as a cloud-based system implementing Storage-as-a-Service (STaaS) functionality.

The storage nodes 105 may be implemented on a common processing platform, or on separate processing platforms.

Each of the storage nodes 105 is illustratively configured to interact with one or more of the client devices 101 and/or the external servers 103. Communications which are initiated by the client devices 101 towards the storage nodes 105 are referred to as "client-initiated" conversations, while communications which are initiated by the storage nodes 105 in the clustered storage system 102 towards the external servers 103 (or, possibly, the client devices 101) are referred to as "server-initiated" conversations. The client devices 101, for example, may be configured to write data to and read data from the clustered storage system 102 comprising the storage nodes 105 in accordance with applications executing on those client devices 101 for system users. The storage nodes 105 of the clustered storage system 102, for example, may be configured to access the external servers 103 for authentication/authorization, for time synchronization, etc.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise. Combinations of cloud and edge infrastructure can also be used in implementing a given information processing system to provide services to users.

Communications between the components of system 100 can take place over the network 104, which may include a global computer network such as the Internet, a wide area network (WAN), a local area network (LAN), a satellite network, a telephone or cable network, a cellular network such as 4G or 5G cellular network, a wireless network such as a WiFi or WiMAX network, or various portions or combinations of these and other types of networks. Various communication protocols, including but not limited to TCP/IP communication protocols, may be used for communication among the components of the system 100 over network 104 or one or more additional networks.

As a more particular example, some embodiments may utilize one or more high-speed local networks in which associated processing devices communicate with one another utilizing Peripheral Component Interconnect express (PCIe) cards of those devices, and networking protocols such as InfiniBand or Gigabit Ethernet, in addition to or in place of FC. Numerous alternative networking arrangements are possible in a given embodiment, as will be appreciated by those skilled in the art. Other examples include remote direct memory access (RDMA) over Converged Ethernet (ROCE) or InfiniBand over Ethernet (IBoE).

The first storage node 105-1 comprises a plurality of storage devices 106-1, one or more associated storage controllers 108-1, and multi-host link aggregation group (MH-LAG) management logic 110-1. The storage controllers 108-1 illustratively control read and/or write of data to the storage devices 106-1 (e.g., in response to IO requests which are received from one or more of the client devices 101 and/or one or more of the external servers 103). As will be described in further detail below, the storage node 105-1 is assumed to be part of a link aggregation group (e.g., a MH-LAG) with other ones of the storage nodes 105 in the clustered storage system 102. The link aggregation group may provide an Active/Active cluster configuration for the clustered storage system 102. The MH-LAG management logic 110-1 provides various functionality for the management of the link aggregation group, including but not limited to creation, modification and deletion of the link aggregation group or nodes which are members thereof, creation and management of host and service virtual logical devices (e.g., host and service virtual local area network (VLAN) logical devices) and associated addresses (e.g., IP addresses) for facilitating both client-initiated and server-initiated conversations, etc.

Each of the other storage nodes 105-2 through 105-M is assumed to be configured in a manner similar to that described above for the first storage node 105-1. Accordingly, by way of example, storage node 105-2 comprises a plurality of storage devices 106-2, one or more associated storage controllers 108-2 and MH-LAG management logic 110-2, and storage node 105-M comprises a plurality of storage devices 106-M, one or more associated storage controllers 108-M and MH-LAG management logic 110-M.

Local persistent storage of a given one of the storage nodes 105 illustratively comprises particular local persistent storage devices that are implemented in or otherwise associated with that storage node. It is assumed that such local persistent storage devices of the given storage node are accessible to the storage controllers of that node via a local interface, and are accessible to storage controllers 108 of respective other ones of the storage nodes 105 via remote interfaces. For example, it is assumed in some embodiments disclosed herein that each of the storage devices 106 on a given one of the storage nodes 105 can be accessed by the given storage node via its local interface, or by any of the other storage nodes 105 via an RDMA interface. A given storage application executing on the storage nodes 105 illustratively requires that all of the storage nodes 105 be able to access all of the storage devices 106. Such access to local persistent storage of each node from the other storage nodes can be performed, for example, using the RDMA interfaces with the other storage nodes, although numerous other arrangements are possible.

The storage controllers 108 of the storage nodes 105 may include additional modules and other components typically found in conventional implementations of storage controllers and storage systems, although such additional modules and other components are omitted from the figure for clarity and simplicity of illustration.

The storage controllers 108 may be associated with one or more write caches and one or more write cache journals, both illustratively distributed across the storage nodes 105 of the clustered storage system 102. It is further assumed in illustrative embodiments that one or more additional journals are provided in the distributed storage system, such as, for example, a metadata update journal and possibly other journals providing other types of journaling functionality for IO operations. Illustrative embodiments disclosed herein are assumed to be configured to perform various destaging processes for write caches and associated journals, and to perform additional or alternative functions in conjunction with processing of IO operations.

The storage devices 106 of the storage nodes 105 illustratively comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of NVM devices may also be used. For example, hard disk drives (HDDs) can be used in combination with or in place of SSDs or other types of NVM devices.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices. Such storage devices are examples of storage devices 106 of the storage nodes 105 of the clustered storage system 102 of FIG. 1.

In some embodiments, the storage nodes 105 of the clustered storage system 102 collectively provide a scale-out storage system, although the storage nodes 105 can be used to implement other types of storage systems in other embodiments. One or more such storage nodes can be associated with at least one storage array. Additional or alternative types of storage products that can be used in implementing a given storage system in illustrative embodiments include software-defined storage, cloud storage and object-based storage. Combinations of multiple ones of these and other storage types can also be used.

As indicated above, the storage nodes 105 in some embodiments comprise respective software-defined storage server nodes of a software-defined storage system, in which the number and types of storage nodes 105 can be dynamically expanded or contracted under software control using software-defined storage techniques.

The term "storage system" as used herein is therefore intended to be broadly construed, and should not be viewed as being limited to certain types of storage systems, such as content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

In some embodiments, communications between the client devices 101 and the storage nodes 105 comprise NVMe commands of an NVMe storage access protocol, for example, as described in the NVMe Specification, Revision 2.0a, July 2021, which is incorporated by reference herein. Other examples of NVMe storage access protocols that may be utilized in illustrative embodiments disclosed herein include NVMe over Fabrics, also referred to herein as NVMeF, and NVMe over TCP, also referred to herein as NVMe/TCP. Other embodiments can utilize other types of storage access protocols. As another example, communications between the client devices 101 and the storage nodes 105 in some embodiments can comprise Small Computer System Interface (SCSI) or Internet SCSI (iSCSI) commands.

Other types of commands may be used in other embodiments, including commands that are part of a standard command set, or custom commands such as a "vendor unique command" or VU command that is not part of a standard command set. The term "command" as used herein is therefore intended to be broadly construed, so as to encompass, for example, a composite command that comprises a combination of multiple individual commands. Numerous other types, formats and configurations of IO operations can be used in other embodiments, as that term is broadly used herein.

In some embodiments, the storage nodes 105 of the clustered storage system 102 of FIG. 1 are connected to each other in a full mesh network, and are collectively managed by a system manager. A given set of storage devices 106 on a given one of the storage nodes 105 is illustratively implemented in a disk array enclosure (DAE) or other type of storage array enclosure of that storage node. Each of the storage nodes 105 illustratively comprises a CPU or other type of processor, a memory, a network interface card (NIC) or other type of network interface, and its corresponding storage devices 106, possibly arranged as part of a DAE of the storage node.

In some embodiments, different ones of the storage nodes 105 are associated with the same DAE or other type of storage array enclosure. The system manager is illustratively implemented as a management module or other similar management logic instance, possibly running on one or more of the storage nodes 105, on another storage node and/or on a separate non-storage node of the distributed storage system.

As a more particular non-limiting illustration, the storage nodes 105 in some embodiments are paired together in an arrangement referred to as a "brick," with each such brick being coupled to a different DAE comprising multiple drives, and each node in a brick being connected to the DAE and to each drive through a separate connection. The system manager may be running on one of the two nodes of a first one of the bricks of the distributed storage system. Again, numerous other arrangements of the storage nodes are possible in a given distributed storage system as disclosed herein.

The clustered storage system 102 may further comprise one or more system management nodes (not shown) that are illustratively configured to provide system management functionality.

As indicated previously, the storage nodes 105 of the clustered storage system 102 process IO operations from one or more of the client devices 101. In processing those IO operations, the storage nodes 105 may run various storage application processes that may involve interaction between multiple ones of the storage nodes. Such IO operations are an example of what is more generally referred to herein as client-initiated conversations. The storage nodes 105 may also direct operations (e.g., authentication operations, authorization operations, time synchronization operations, etc.) to entities outside the clustered storage system 102, such as one or more of the external servers 103 and possibly one or more of the client devices 101. Such operations are examples of what is more generally referred to herein as server-initiated conversations.

In the FIG. 1 embodiment, the storage nodes 105 of the clustered storage system 102 comprise storage controllers 108 and corresponding sets of storage devices 106 along with MH-LAG management logic 110, and may include additional or alternative components.

The storage controllers 108 illustratively control the processing of IO operations received in the clustered storage system 102 from the client devices 101. For example, the storage controllers 108 illustratively manage the processing of read and write commands directed by the client devices 101 to particular ones of the storage devices 106. The storage controllers 108 can be implemented as respective storage processors, directors or other storage system components configured to control storage system operations relating to processing of IO operations. In some embodiments, each of the storage controllers 108 has a different local cache associated therewith, although numerous alternative arrangements are possible.

As indicated previously, the storage nodes 105 collectively comprise an example of a distributed storage system. The term "distributed storage system" as used herein is intended to be broadly construed, so as to encompass, for example, scale-out storage systems, clustered storage systems or other types of storage systems distributed over multiple storage nodes.

Also, the term "storage volume" as used herein is intended to be broadly construed, and should not be viewed as being limited to any particular format or configuration.

In some embodiments, the storage nodes 105 are implemented using processing modules that are interconnected in a full mesh network, such that a process of one of the processing modules can communicate with processes of any of the other processing modules. Commands issued by the processes can include, for example, remote procedure calls (RPCs) directed to other ones of the processes.

The sets of processing modules of the storage nodes 105 illustratively comprise control modules, data modules, routing modules and at least one management module. Again, these and possibly other processing modules of the storage nodes 105 are illustratively interconnected with one another in the full mesh network, such that each of the modules can communicate with each of the other modules, although other types of networks and different module interconnection arrangements can be used in other embodiments.

The management module in such an embodiment may more particularly comprise a system-wide management module, also referred to herein as a system manager. Other embodiments can include multiple instances of the management module implemented on different ones of the storage nodes 105.

A wide variety of alternative configurations of nodes and processing modules are possible in other embodiments. Also, the term "storage node" as used herein is intended to be broadly construed, and may comprise a node that implements storage control functionality but does not necessarily incorporate storage devices. As mentioned previously, a given storage node can in some embodiments comprise a separate storage array, or a portion of a storage array that includes multiple such storage nodes.

Communication links may be established between the various processing modules of the storage nodes using communication protocols such as TCP/IP and RDMA. For example, respective sets of IP links used in data transfer and corresponding messaging could be associated with respective different ones of the routing modules.

The storage nodes 105 of the clustered storage system 102 implement MH-LAG management logic 110, which is configured to manage a MH-LAG including the storage nodes 105 of the clustered storage system 102. The MH-LAG may provide Active/Active cluster functionality. The MH-LAG management logic 110, for example, may be configured to generate, for each of the storage nodes 105, a "host" virtual logical device (e.g., a host VLAN logical device) and a "service" virtual logical device (e.g., a service VLAN logical device). The host and service virtual logical devices on each of the storage nodes 105 may be associated with a static bond. The host virtual logical devices of the storage nodes 105 are associated with respective distinct host addresses (e.g., different host IP addresses), while the service virtual logical devices of the storage nodes 105 are associated with the same service address (e.g., the same service IP (SIP) address). The host virtual logical devices and host addresses of the storage nodes 105 are configured for use with "server-initiated" conversations (e.g., between ones of the storage nodes 105 and the one or more external servers 103), while the service virtual logical devices and the service address of the storage nodes are configured for use with "client-initiated" conversations (e.g., between the client devices 101 and the storage nodes 105).

The network switches 112 in the network 104 interconnect the client devices 101, the external servers 103 and the storage nodes 105 of the clustered storage system 102. The network switches 112 are configured with MH-LAG communications distribution logic 114. The MH-LAG communications distribution logic 114 is configured to control links (e.g., between each of the storage nodes 105 and the network switches 112) which are used for client-initiated and server-initiated conversations based on which addresses and virtual logical device "tags" are included in network frames which are part of the client-initiated and server-initiated conversations. When the network switches 112 receive a network frame with the service address and/or service tag (e.g., a service VLAN tag), the MH-LAG communications distribution logic 114 may implement a selection algorithm for selecting among the multiple storage nodes 105 which are part of the MH-LAG. When the network switches 112 receive a network frame with a specified host address and/or host tag (e.g., a host VLAN tag), the MH-LAG communications distribution logic 114 will select a particular one of the storage nodes 105 associated with the specified host address or host tag. In some embodiments, mappings or other associations between tags, addresses, links, ports, etc. may be maintained in a network database 116 accessible to the network switches 112.

The particular features described above in conjunction with FIG. 1 should not be construed as limiting in any way, and a wide variety of other system arrangements providing functionality for security management for endpoint nodes of distributed processing systems are possible.

The storage nodes 105 of the example clustered storage system 102 illustrated in FIG. 1 are assumed to be implemented using at least one processing platform, with each such processing platform comprising one or more processing devices, and each such processing device comprising a processor coupled to a memory. Such processing devices can illustratively include particular arrangements of compute, storage and network resources.

The storage nodes 105 may be implemented on respective distinct processing platforms, although numerous other arrangements are possible. At least portions of their associated client devices 101 may be implemented on the same processing platforms as the storage nodes 105 or on separate processing platforms.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for different subsets of the client devices 101 and the storage nodes 105 to reside in different data centers. Numerous other distributed implementations of the storage nodes 105 and their respective associated sets of client devices 101 are possible.

Additional examples of processing platforms utilized to implement storage systems and possibly their associated host devices in illustrative embodiments will be described in more detail below in conjunction with FIGS. 18 and 19.

It is to be appreciated that these and other features of illustrative embodiments are presented by way of example only, and should not be construed as limiting in any way.

Accordingly, different numbers, types and arrangements of system components such as client devices 101, clustered storage system 102, storage nodes 105, storage devices 106, storage controllers 108, MH-LAG management logic 110, network switches 112, MH-LAG communications distribution logic 114 and network database 116 can be used in other embodiments.

It should be understood that the particular sets of modules and other components implemented in a distributed storage system as illustrated in FIG. 1 are presented by way of example only. In other embodiments, only subsets of these components, or additional or alternative sets of components, may be used, and such components may exhibit alternative functionality and configurations.

For example, in some embodiments, certain portions of the functionality for managing communications for host devices which are part of a multi-host link aggregation group as disclosed herein may be implemented through cooperative interaction of one or more host devices, one or more storage nodes of a distributed storage system, and/or one or more system management nodes. Accordingly, such functionality can be distributed over multiple distinct processing devices. The term "at least one processing device" as used herein is therefore intended to be broadly construed.

The operation of the information processing system 100 will now be described in further detail with reference to the flow diagram of the illustrative embodiment of FIG. 2, which illustrates a process for managing communications for host devices which are part of a multi-host link aggregation group. This process may be viewed as an illustrative example of an algorithm implemented at least in part by one or more of the storage nodes 105 and/or one or more of the network switches 112 utilizing corresponding instance of the MH-LAG management logic 110 and MH-LAG communications distribution logic 114. These and other algorithms for managing communications for host devices which are part of a multi-host link aggregation group as disclosed herein can be implemented using other types and arrangements of system components in other embodiments.

Figure 2:
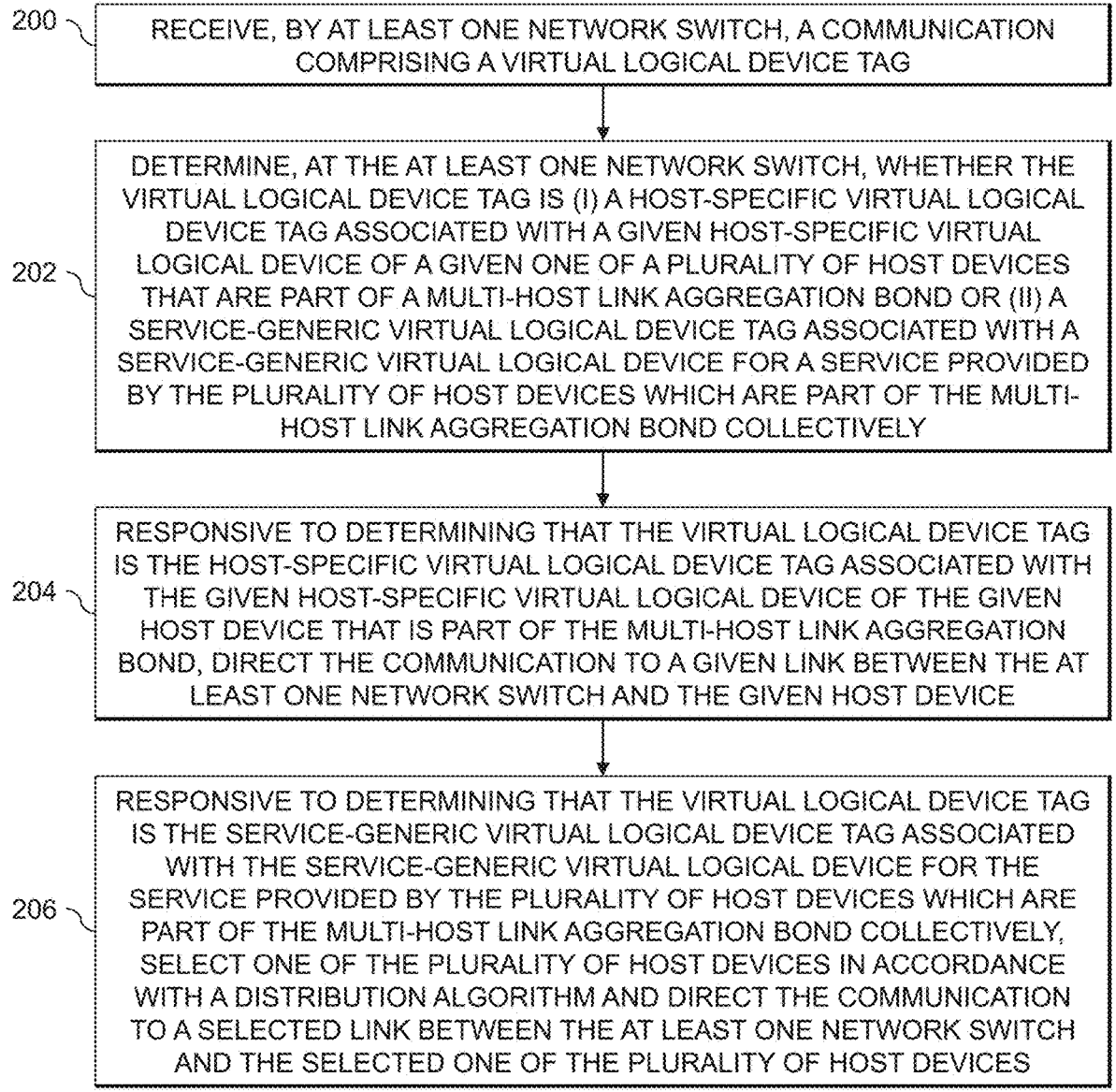
FIG. 2 is a flow diagram of an exemplary process for managing communications for host devices which are part of a multi-host link aggregation group in an illustrative embodiment.

The process illustrated in FIG. 2 includes steps 200 through 206. In step 200, a communication comprising a virtual logical device tag is received by at least one network switch. The at least one network switch may maintain a data structure mapping links between the at least one network switch and ones of a plurality of host devices. In step 202, a determination is made at the at least one network switch as to whether the virtual logical device tag is (i) a host-specific virtual logical device tag associated with a given host-specific virtual logical device of a given one of the plurality of host devices that are part of a multi-host link aggregation bond or (ii) a service-generic virtual logical device tag associated with a service-generic virtual logical device for a service provided by the plurality of host devices which are part of the multi-host link aggregation bond collectively. Responsive to determining that the virtual logical device tag is the host-specific virtual logical device tag associated with the given host-specific virtual logical device of the given host device that is part of the multi-host link aggregation bond, the communication is directed in step 204 to a given link between the at least one network switch and the given host device.

Responsive to determining that the virtual logical device tag is the service-generic virtual logical device tag associated with the service-generic virtual logical device for the service provided by the plurality of host devices which are part of the multi-host link aggregation bond collectively, in step 206 one of the plurality of host devices is selected in accordance with a distribution algorithm and the communication is directed to a selected link between the at least one network switch and the selected one of the plurality of host devices. The distribution algorithm may comprise a load balancing distribution algorithm. The plurality of host devices which are part of the multi-host link aggregation bond may provide an active-active cluster utilizing Link Aggregation Control Protocol (LACP) bond frame distribution for performing load balancing among the plurality of host devices.

Each of the plurality of host devices may comprise a static bond for a first host-specific virtual logical device associated with a host-specific network address and a second service-generic virtual logical device associated with a common service network address shared by the plurality of host devices that are part of the multi-host link aggregation bond. The host-specific network address and the common service network address may each comprise an Internet Protocol (IP) address and/or a Media Access Control (MAC) address. The first host-specific virtual logical device and the second service-generic virtual logical device may comprise virtual local area network (VLAN) logical devices. The static bond of each of the plurality of host devices may be associated with a common aggregated Media Access Control (MAC) address and a common virtual Internet Protocol (IP) address for the multi-host link aggregation bond.

The plurality of host devices may be part of a clustered system. The host-specific virtual logical device tag may be used for communications initiated by respective ones of the plurality of host devices to one or more external servers outside the clustered system. The one or more external servers may comprise at least one of a network time server, an authentication server, and an authorization server. The service-generic virtual logical device tag may be used for communications initiated by client devices for the service provided by the plurality of host devices which are part of the multi-host link aggregation bond collectively. In some embodiments, the clustered system comprises a clustered storage system, and the service provided by the plurality of host devices which are part of the multi-host link aggregation bond collectively comprises a storage service.

With improvements in backend network bandwidth and latency, inter-node speeds in a scale-out cluster have reached a level comparable to that of a system bus within a single node. For example, multiple nodes in the scale-out cluster may be interconnected with a dedicated high-speed network, such as a 100 Gigabit Ethernet (100 GbE) network, with low latency Quad Data Rate InfiniBand (QDR IB) being used for cache coherence and synchronization for backend IO operations from any node. As a result, scale-out clustering architecture has emerged as a dominant approach for efficiently handling IO operations and requests from a large number of clients.

In scale-out clusters, an Ethernet front-end network may utilize Internet Protocol (IP). Although the bandwidth is improved, the access of services may have no significant changes. For example, most software applications may operate in a client/server mode, where the client depends on a network socket to access a service, and the socket address is the combination of the protocol type, IP address and port number. If the service is being provided by a cluster (e.g., of multiple servers or nodes) rather than a single server, various mechanisms may be used to implement the service using the cluster. Such mechanisms include, for example, an Active/Standby cluster where a floating service IP address is configured on an active node only, an Active/Active cluster where a load balancer node or service is used to distribute requests from clients to each of the active nodes, etc.

Figure 3A:
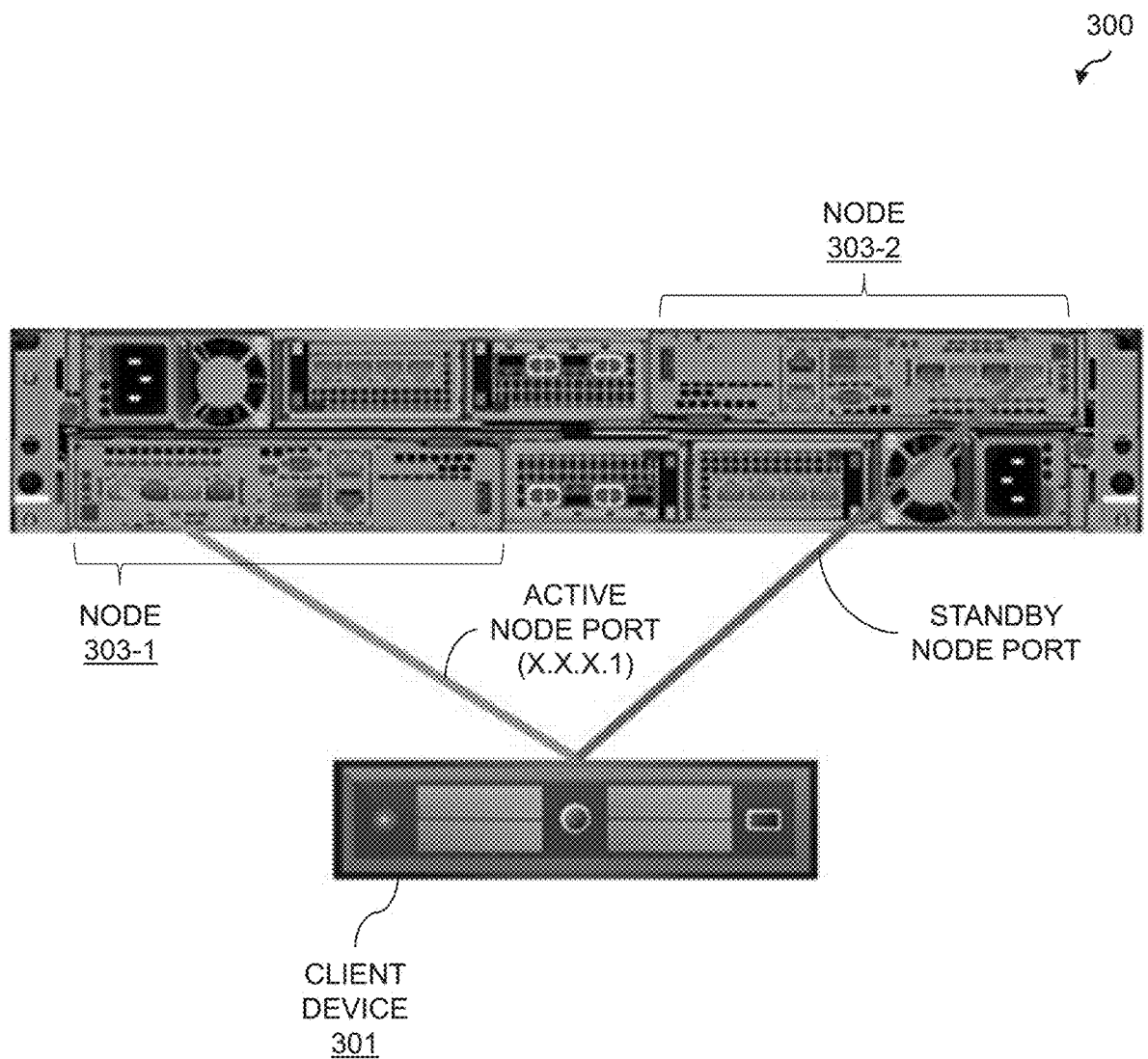
FIGS. 3A and 3B show a cluster of nodes in an Active/Standby configuration in an illustrative embodiment.
Figure 3B:
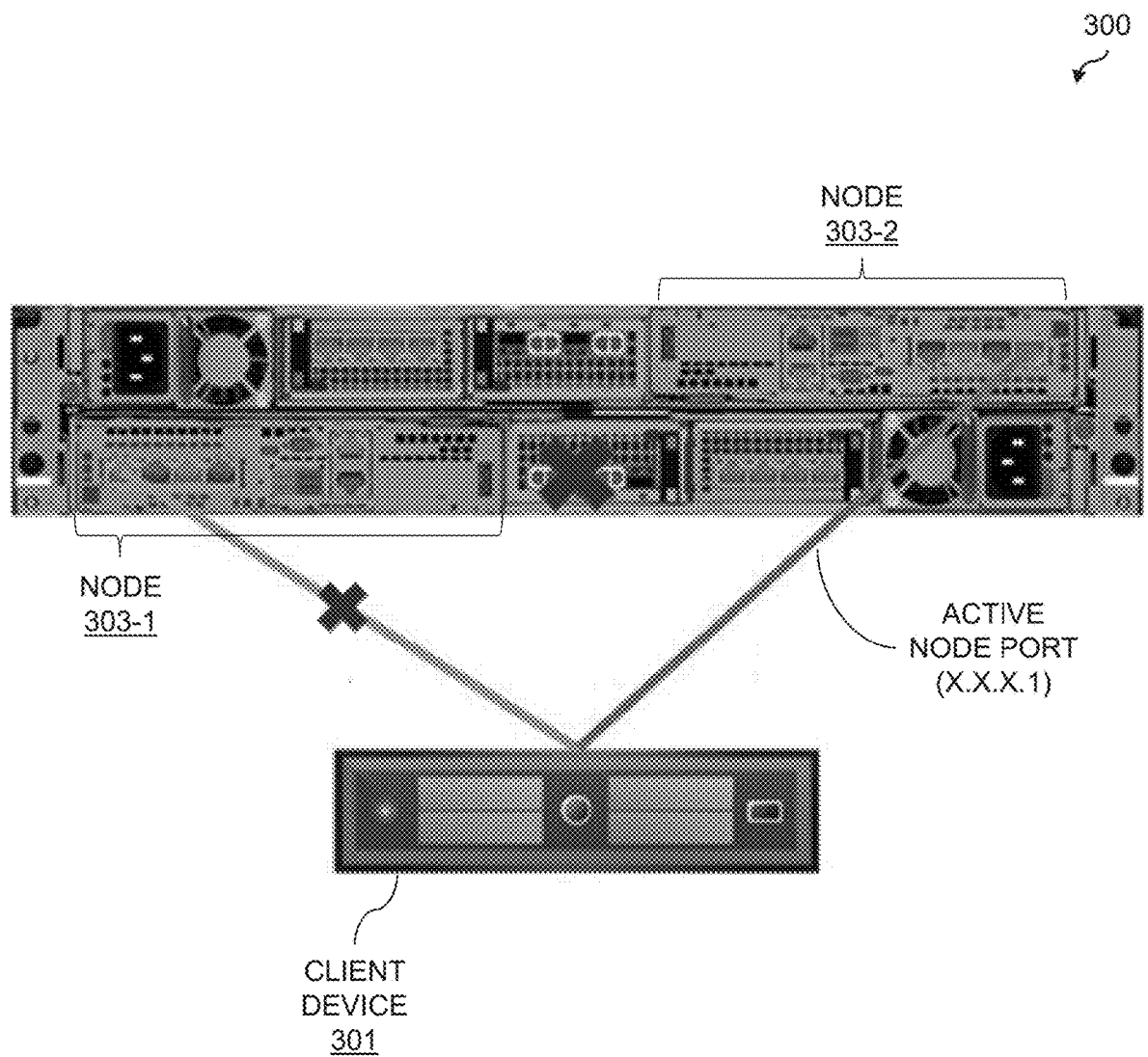

FIGS. 3A and 3B show a Network Attached Storage (NAS) cluster system 300 configured in an Active/Standby mode with a floating service IP address. The NAS cluster system 300 includes nodes 303-1 and 303-2 (collectively, nodes 303) which are accessed by a client device 301. As shown in FIG. 3A, the node 303-1 is set as the active node with an active node port configured with a floating service IP address (X.X.X.1), with the node 303-2 being set as the standby node with a standby node port. All IO operations are served by the active node (e.g., node 303-1) only. When a failure happens to the node currently designated as the active node (e.g., node 303-1 in the FIG. 3A example), failover to the standby node (e.g., node 303-2 in the FIG. 3A example) is performed and the standby node becomes active. This is illustrated in FIG. 3B, where the link between the client device 301 and the node 303-1 is failed, and the node 303-2 is set to be the active node. This includes configuring the floating service IP address (X.X.X.1) for the active node port of the node 303-2.

Figure 4A:
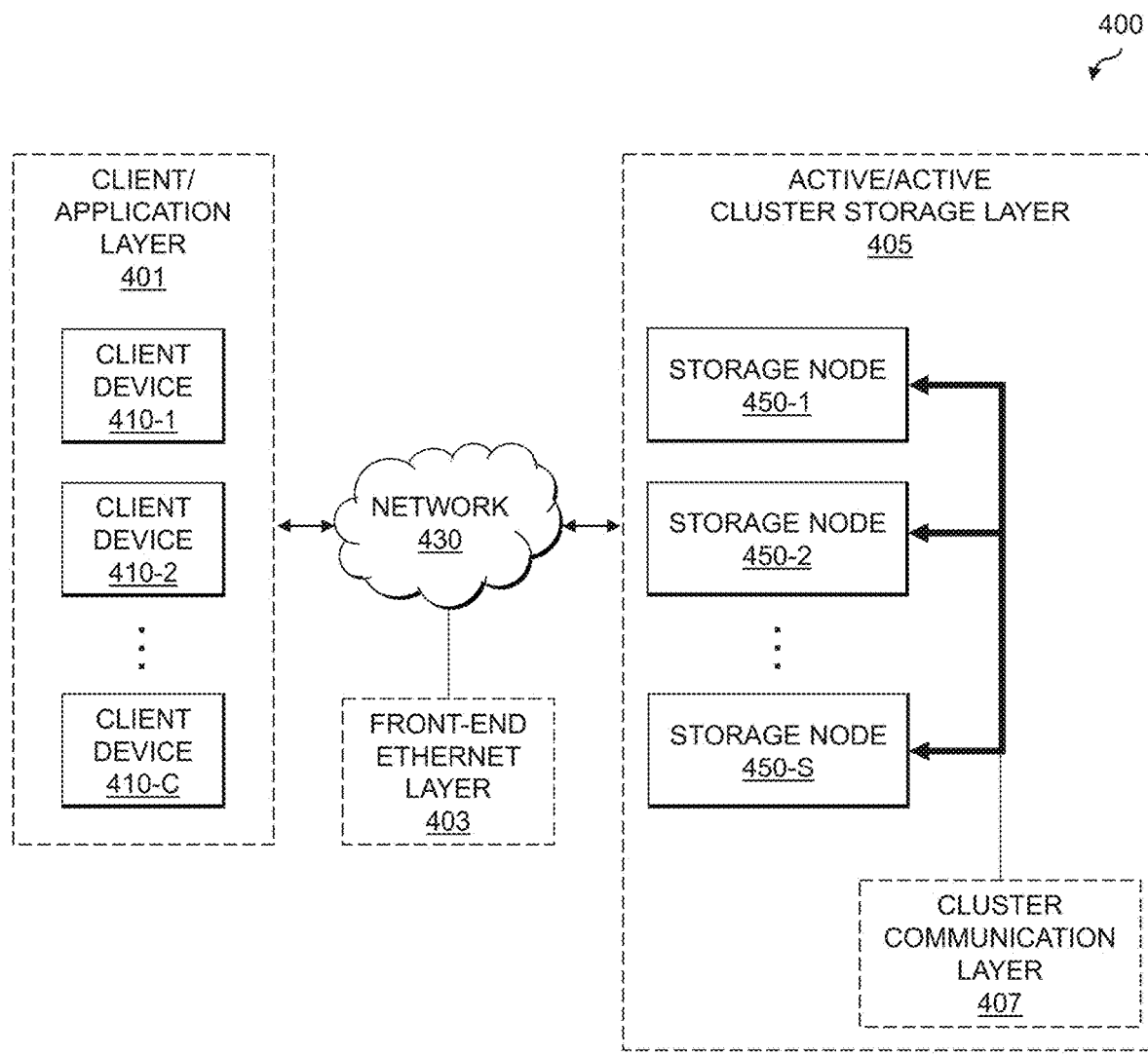
FIGS. 4A and 4B show a cluster of nodes in an Active/Active configuration with a load balancer entity in an illustrative embodiment.
Figure 4B:
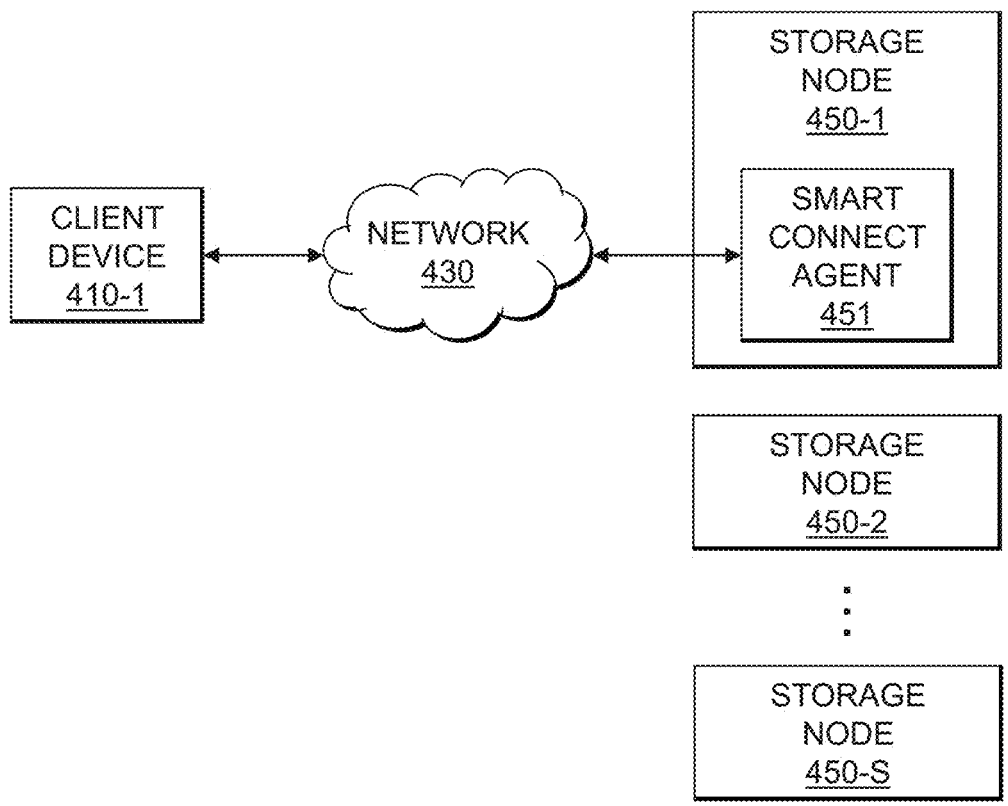

FIGS. 4A and 4B show a scale-out cluster system 400 operating in an Active/Active mode by utilizing a Doman Name Service (DNS)-based workload balancer. As shown in FIG. 4A, the scale-out cluster system 400 includes a client/application layer 401 with a plurality of client devices 410-1, 410-2 . . . 410-C(collectively, client devices 410) which communicate via a front-end Ethernet layer 403 using network 430 (e.g., implementing one or more of a Network File System (NFS) protocol, a Server Message Block (SMB) protocol, a Hadoop Distributed File System (HDFS), an Amazon Simple Storage Service (Amazon S3), File Transfer Protocol (FTP), etc.) with an Active/Active cluster storage layer 405 comprising a plurality of storage nodes 450-1, 450-2 . . . 450-S(collectively, storage nodes 450). The storage nodes 450 communicate with one another via a cluster communication layer 407. The Active/Active cluster storage layer 405 uses a scale-out approach for storage by creating the cluster of the storage nodes 450 which runs a distributed file system. Each of the storage nodes 450 in the cluster can accept and serve client requests, and the file share content is accessible through all the storage nodes 450 in the cluster simultaneously.

Each of the storage nodes 450 in the cluster will be assigned a dedicated IP address for serving client requests. Although the storage nodes 450 could access a file share simultaneously in the backend (e.g., via cluster communication layer 407), in the frontend if the client devices 410 are accessing the service with one socket address (e.g., an IP address, protocol and port), then only one of the storage nodes 450 in the cluster can serve the client requests. A parallel distributed networked file system, such as the OneFS file system, may utilize a technology referred to as SmartConnect (e.g., which uses an existing DNS server, not shown in FIGS. 4A and 4B) to provide load balancing services that work at the front-end Ethernet layer 403 to distribute client connections across the cluster of storage nodes 450. As shown in FIG. 4B, a smart connect agent 451 runs on one of the storage nodes 450-1 in the cluster of storage nodes 450. The smart connect agent 451 acts as a DNS delegation server to return IP addresses. If the storage node 450-1 providing the SmartConnect service becomes unavailable, the SmartConnect service IP (SIP) address automatically moves to a different one of the storage nodes 450 in the cluster. It should be noted, however, that SmartConnect is just one example of a DNS-based load balancing approach.

The Active/Standby mode provides high availability (HA) but, if the workload is increased, a system implementing the Active/Standby mode cannot balance the workload to the standby node. Thus, performance is a challenge in high concurrency scenarios. The Active/Active mode (e.g., in a scale-out cluster) is scalable and is thus well-suited for use in data centers with large numbers of nodes. In the Active/Active mode, however, the workload balancer (e.g., the smart connect agent 451 in the example of FIGS. 4A and 4B) always runs on an independent server or one of the nodes in the cluster, which is a bottleneck and a single failure point. To address the HA of the workload balancer, an Active/Standby mechanism is introduced which breaks the Active/Active purity of the cluster. In addition, IP address management (e.g., IP address allocation, failover, rebalancing, etc.) for a cluster takes extra effort. Illustrative embodiments provide technical solutions for implementing a pure Active/Active cluster without introducing extra entities like a load balancer, which simplifies the fronted and provides improved performance.

Figure 5:
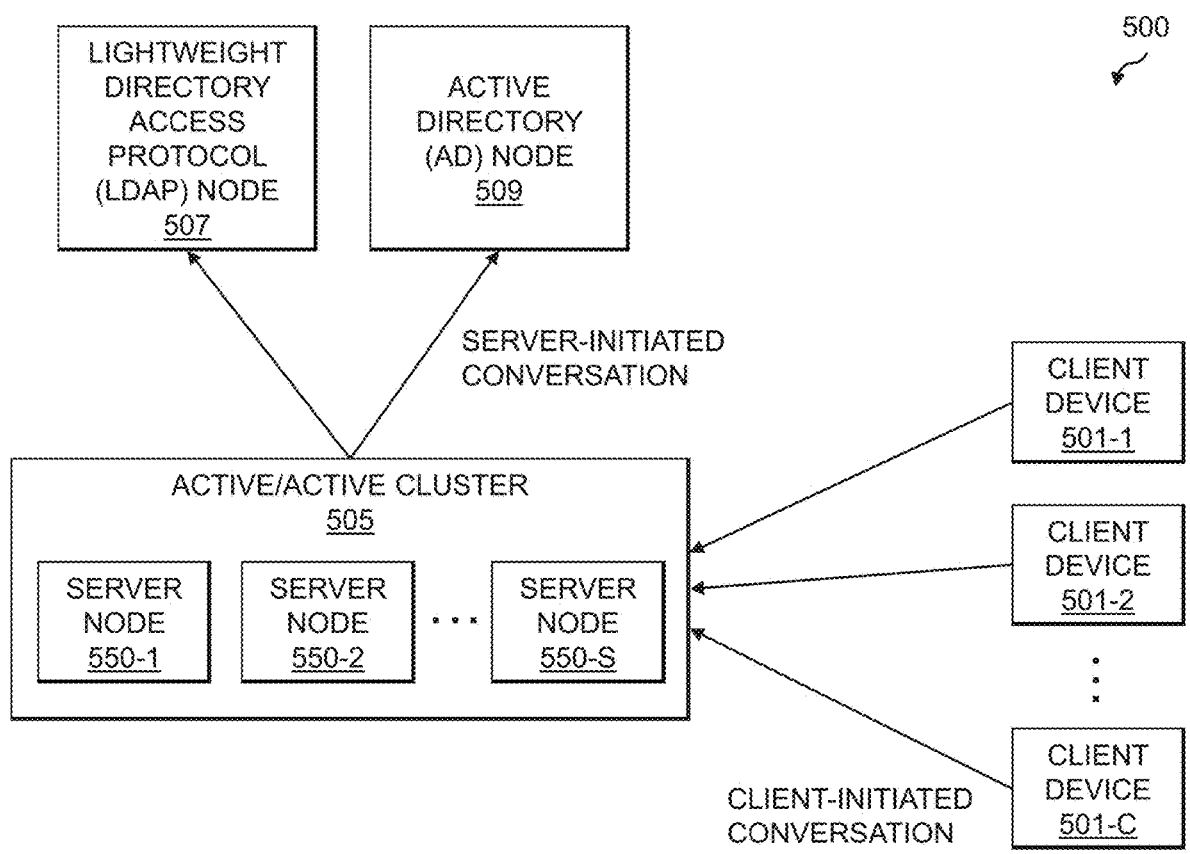
FIG. 5 shows client-initiated and server-initiated communications in a system including an Active/Active cluster of nodes in an illustrative embodiment.

In some embodiments, an approach referred to as "Multi-Host Link Aggregation" is used for an Active/Active cluster. Multi-Host Link Aggregation can handle client-initiated communications (e.g., also referred to as client-initiated conversations), but cannot guarantee that server-initiated communications (e.g., also referred to as server-initiated conversations) are established and maintained correctly. Thus, Multi-Host Link Aggregation is applicable for cluster systems which will not initiate conversations to external servers. For sophisticated cluster systems, however, it is critical to support both client-initiated and server-initiated conversations. Client-initiated conversations include, for example, IO operation requests from the client side (e.g., Internet Small Computer Systems Interface (iSCSI), Non-Volatile Memory Express (NVMe) over Transport Control Protocol (TCP) (NVMe-over-TCP), NFS, SMB, object storage, etc.). Server-initiated conversations include, for example, requests from nodes in the cluster to external servers (e.g., authorization/authentication requests like Active Directory (AD), Lightweight Directory Access Protocol (LDAP), Kerberos, etc.). FIG. 5 shows a system 500 illustrating an Active/Active cluster 505 comprising a plurality of server nodes 550-1, 550-2 . . . 550-S(collectively, server nodes 550) which are accessed by a plurality of client devices 501-1, 501-2 . . . 501-C (collectively, client devices 501). The client devices 501 initiate communications (e.g., client-initiated conversations) with the Active/Active cluster 505. The server nodes 550 of the Active/Active cluster 505 also initiate communications (e.g., server-initiated conversations) with external servers such as an LDAP node 507 and AD node 509. The technical solutions described herein extend the Multi-Host Link Aggregation approach to support both client-initiated and server-initiated conversations.

Figure 6:
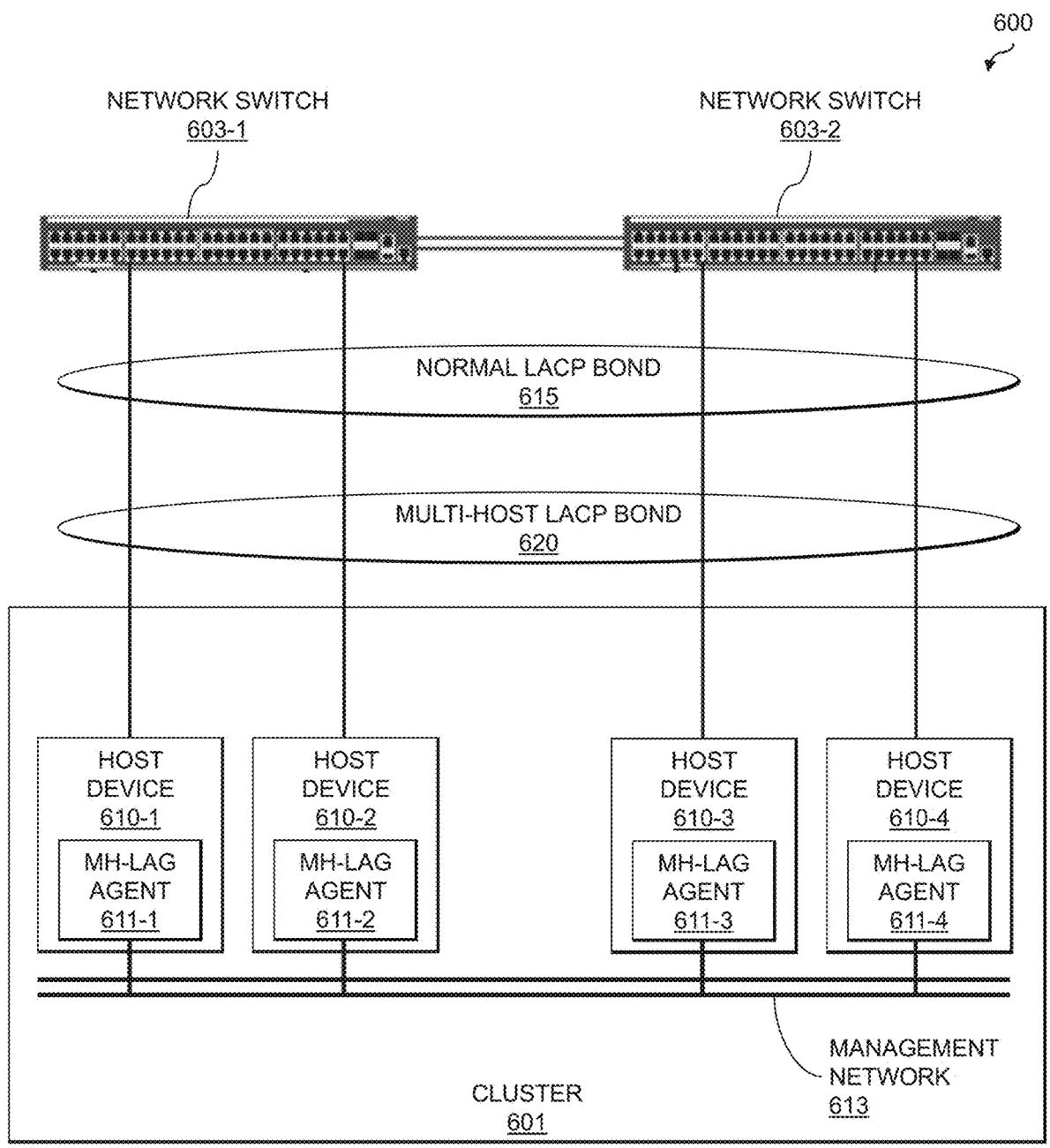
FIG. 6 shows a system including a cluster of host devices which are part of a multi-host link aggregation bond in an illustrative embodiment.

FIG. 6 shows a system 600 implementing Multi-Host Link Aggregation. The system 600 includes a cluster 601 with a plurality of host devices 610-1, 610-2, 610-3 and 610-4 (collectively, host devices 610). The host devices 610 are in communication with network switches 603-1 and 603-2 (collectively, network switches 603). A cross-host bond, referred to as a multi-host LACP bond 620, is built for the host devices 610. The multi-host LACP bond 620 is viewed as a normal LACP bond 615 by peer ports on the network switches 603. MH-LAG agents 611-1, 611-2, 611-3 and 611-4 (collectively, MH-LAG agents 611) run on each of the host devices 610-1, 610-2, 610-3 and 610-4 in the cluster 601. The MH-LAG agents 611 are responsible for managing (e.g., creating, modifying, deleting, etc.) MH-LAGs of the cluster 601, for sending requests (LACPDUs) to peers (e.g., the network switches 603), for syncing Address Resolution Protocol (ARP) caches with all involved hosts, etc. The MH-LAG agents 611 communicate with each other via a management network 613.

Figure 7:
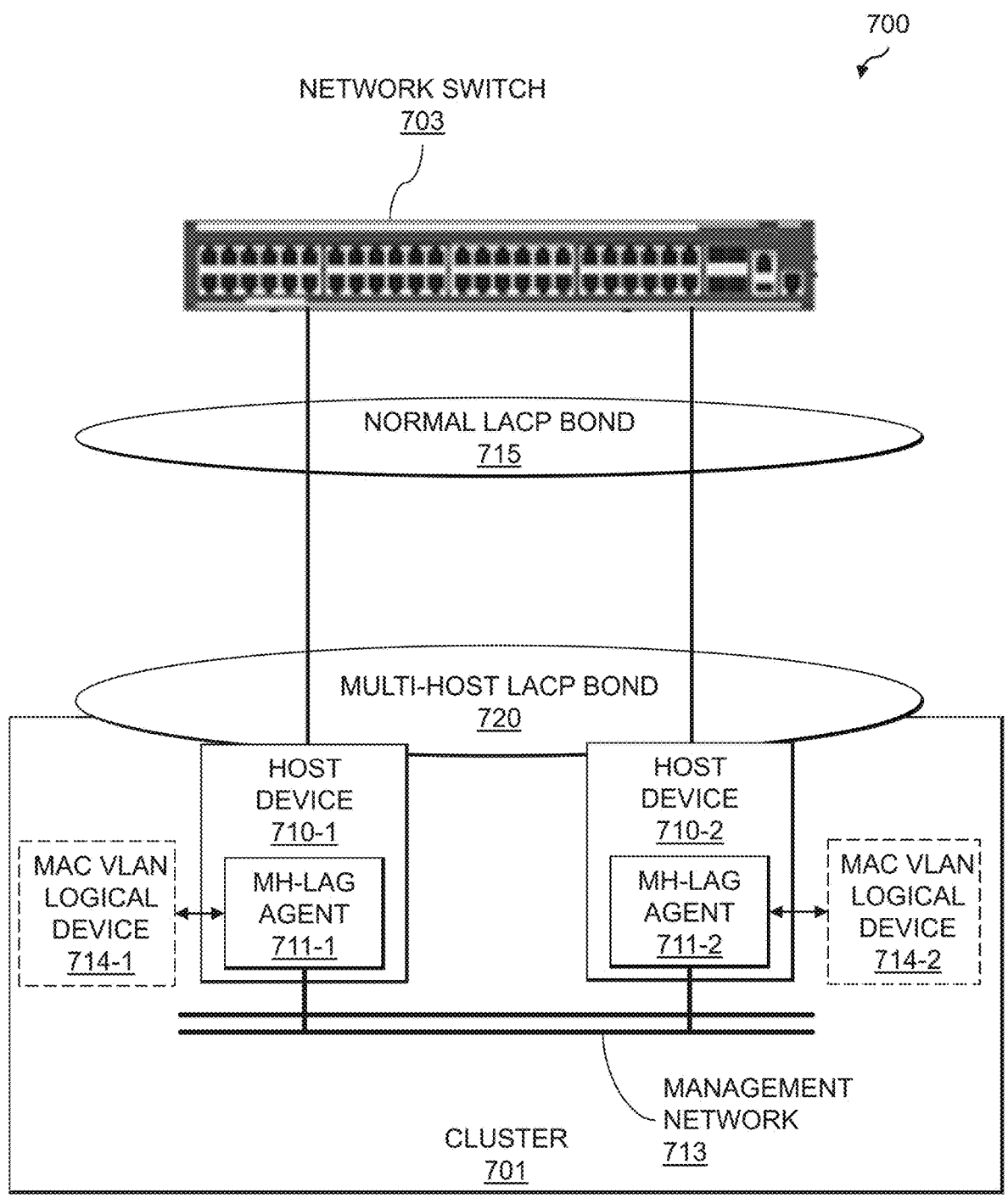
FIG. 7 shows a system including a cluster of host devices which are part of a multi-host link aggregation bond with a single link between each host device and a network switch in an illustrative embodiment.
Figure 8:
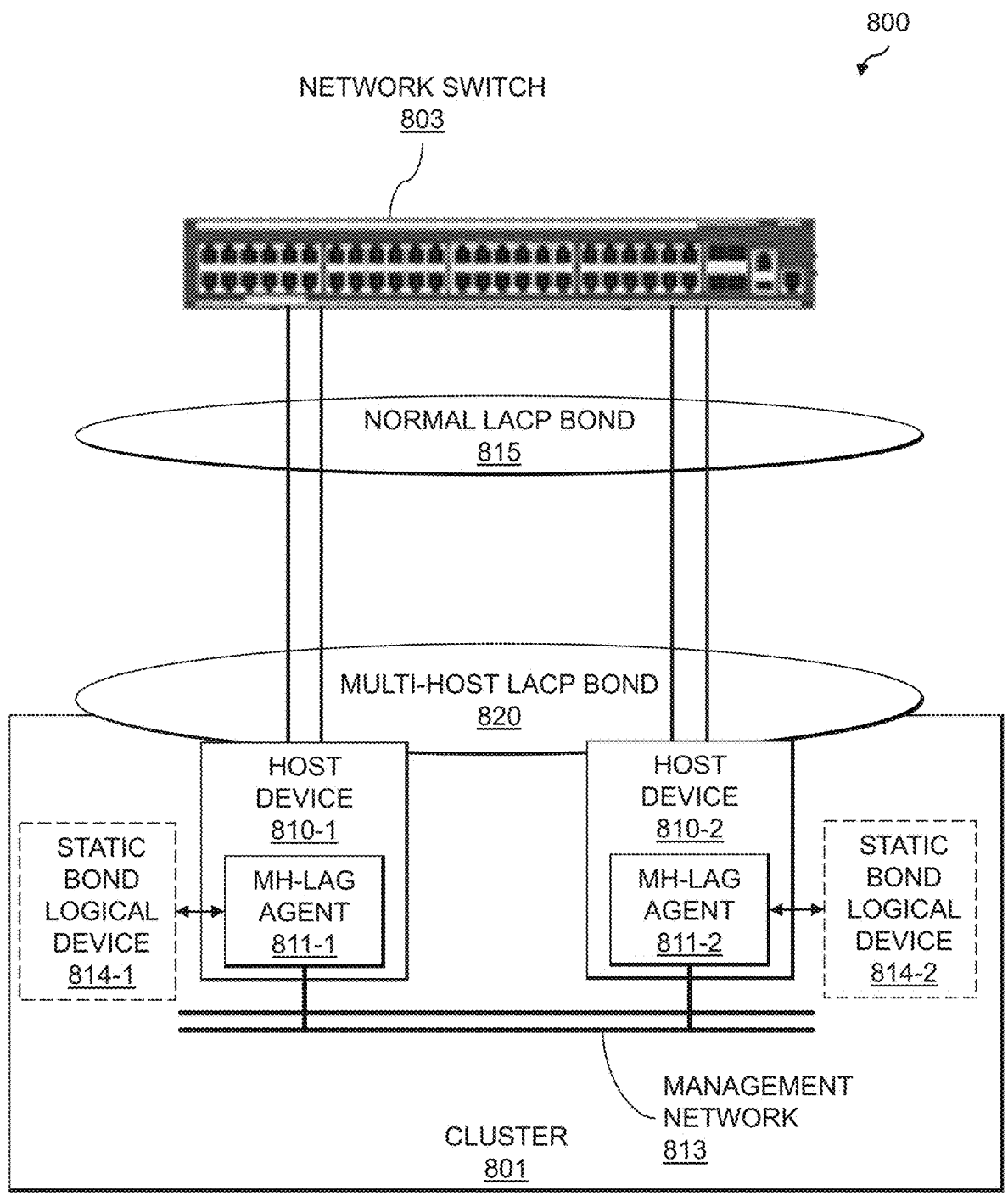
FIG. 8 shows a system including a cluster of host devices which are part of a multi-host link aggregation bond with multiple links between each host device and a network switch in an illustrative embodiment.

The Multi-Host Link Aggregation approach may use different kinds of configurations, such as a single link per host configuration illustrated in FIG. 7 and a multiple link per host configuration illustrated in FIG. 8.

FIG. 7 shows a system 700 implementing the single link per host Multi-Host Link Aggregation approach. The system 700 includes a cluster 701 with host devices 710-1 and 710-2 (collectively, host devices 710), where each of the host devices 710 has a single link with a peer port on a network switch 703. The host devices 710 are part of a multi-host LACP bond 720, which appears to the network switch 703 as a normal LACP bond 715. The host devices 710-1 and 710-2 implement respective MH-LAG agents 711-1 and 711-2 (collectively, MH-LAG agents 711) which communicate over a management network 713. The MH-LAG agents 711 coordinate with each other to crate local Media Access Control (MAC) Virtual Local Area Network (VLAN) logical devices 714-1 and 714-2 (collectively, MAC VLAN logical devices 714) with the same MAC address on each of the host devices 710 separately.

FIG. 8 shows a system 800 implementing the multiple link per host Multi-Host Link Aggregation approach. The system 800 includes a cluster 801 with host devices 810-1 and 810-2 (collectively, host devices 810), where each of the host devices 810 has multiple links with peer ports on a network switch 803. The host devices 810 are part of a multi-host LACP bond 820, which appears to the network switch 803 as a normal LACP bond 815. The host devices 810-1 and 810-2 implement respective MH-LAG agents 811-1 and 811-2 (collectively, MH-LAG agents 811) which communicate over a management network 813. The MH-LAG agents 811 coordinate with each other to create local static bond logical devices 814-1 and 814-2 (collectively, static bond logical devices 814) with the same MAC address on each of the host devices 810 separately.

Figure 9:
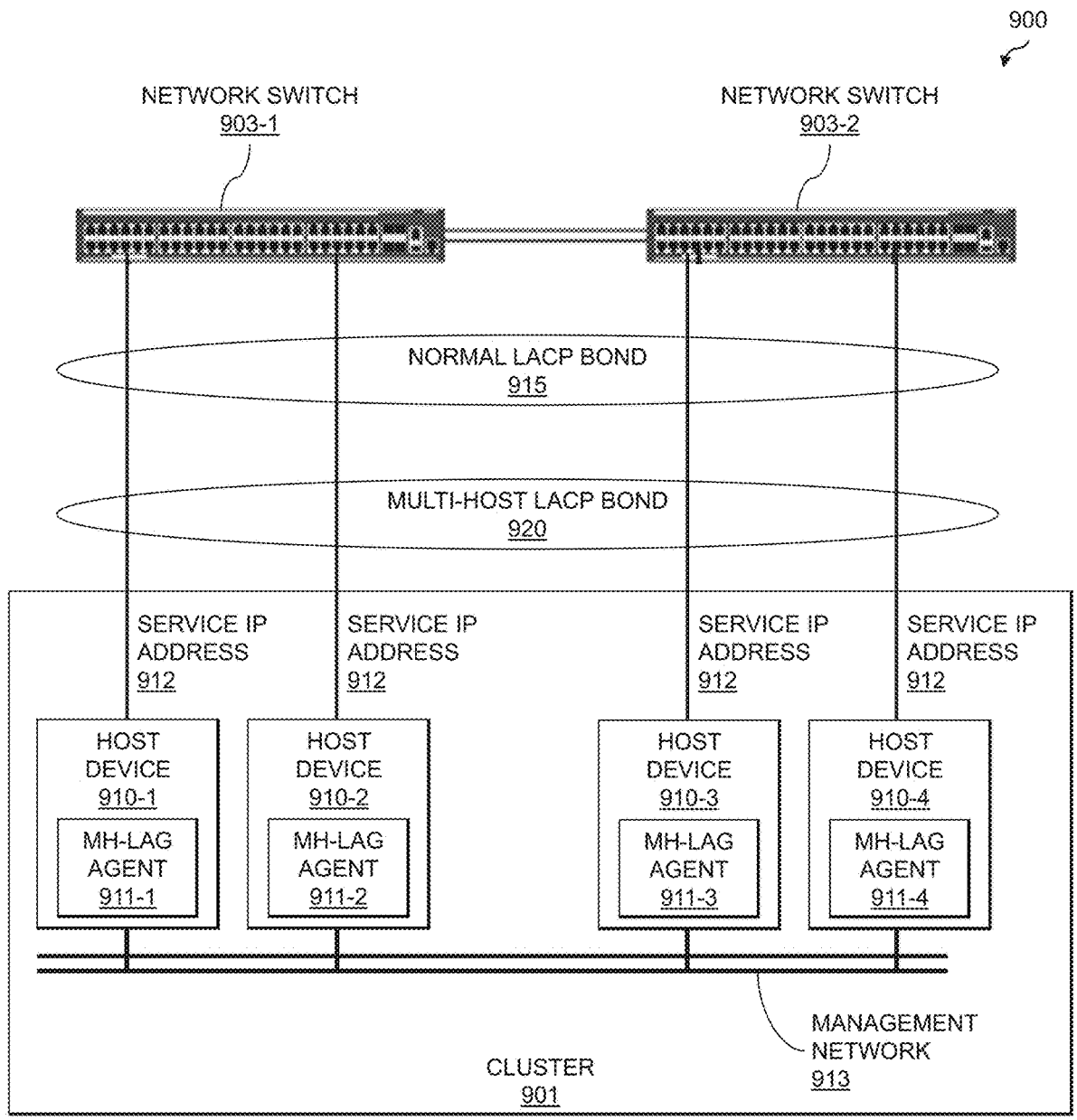
FIG. 9 shows a system including a cluster of host devices which are part of a multi-host link aggregation bond and in which each host device is configured with a same service Internet Protocol address in an illustrative embodiment.

After the Multi-Host LACP bond is configured, an identical service IP (SIP) address may be configured on each host device. In a normal situation, duplicated IP addresses would cause communication chaos. As will be described in further detail below, the Multi-Host Link Aggregation approach allows such an arrangement to work using the Multi-Host LACP bond. FIG. 9 shows a system 900 implementing the Multi-Host Link Aggregation approach. The system 900 includes a cluster 901 with a plurality of host devices 910-1, 910-2, 910-3 and 910-4 (collectively, host devices 910). The host devices 910 are in communication with network switches 903-1 and 903-2 (collectively, network switches 903). The Multi-Host Link Aggregation approach builds a cross-host bond, referred to as a multi-host LACP bond 920, for the host devices 910. The multi-host LACP bond 920 is viewed as a normal LACP bond 915 by peer ports on the network switches 903. MH-LAG agents 911-1, 911-2, 911-3 and 911-4 (collectively, MH-LAG agents 911) run on each of the host devices 910-1, 910-2, 910-3 and 910-4 in the cluster 901. The MH-LAG agents 911 are responsible for managing (e.g., creating, modifying, deleting, etc.) MH-LAGs of the cluster 901, sending requests (LACPDUs) to peers (e.g., the network switches 903), syncing ARP cache with all involved hosts, etc. The MH-LAG agents 911 communicate with each other via a management network 913. Each of the host devices 910-1, 910-2, 910-3 and 910-4 which is part of the multi-host LACP bond 920 is configured with the same service IP address 912.

It should be appreciated that the particular number of host devices within a cluster which are part of a multi-host LACP bond may vary, and the number of links between each host device and one or more network switches may similarly vary. While FIGS. 6 and 9 show systems 600 and 900 where there are two network switches (e.g., 603-1 and 603-2, 903-1 and 903-2) interconnected with one another, FIGS. 7 and 8 shows systems 700 and 800 with single network switches 703 and 803. Some host devices may have a single link with a peer port on a single network switch, while other host devices may have multiple (e.g., two or more) links with peer ports on one or multiple network switches. Various other examples are possible.

Figure 10:
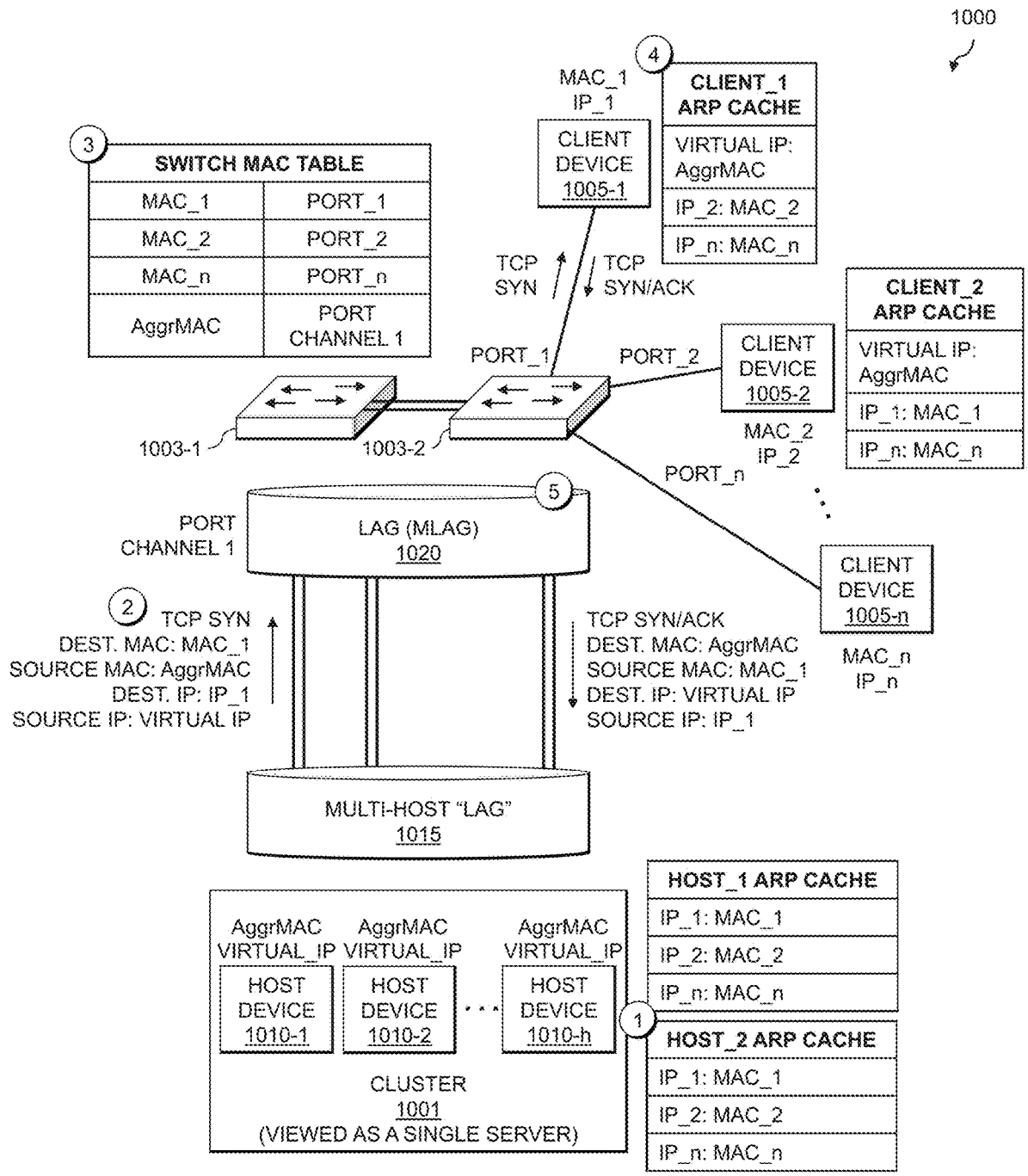
FIG. 10 shows a server-initiated conversation in a system including a cluster of host devices which are part of a multi-host link aggregation bond in an illustrative embodiment.

FIG. 10 shows a system 1000, including a cluster 1001 comprising a plurality of host devices 1010-1, 1010-2, . . . 1010-h (collectively, host devices 1010) which are part of a multi-host link aggregation group (LAG) 1015, which communicates with a LAG (e.g., a multi-chassis LAG or MLAG) 1020 associated with network switches 1003-1 and 1003-2 (collectively, network switches 1003). The system 1000 also includes a plurality of client devices 1005-1, 1005-2, . . . 1005-n (collectively, client devices 1005) which are connected to the network switches 1003. Due to the multi-host LAG 1015, the host devices 1010 of the cluster 1001 appear, or are viewed as, a single server from the perspective of the client devices 1005. The host devices 1010 are associated with a same aggregated MAC address (AggrMAC) and virtual IP address. Consider a process flow for initiating a TCP session from the cluster 1001 side (e.g., from host device 1010-1 in the cluster 1001 to the client device 1005-1). The process flow includes steps 1 through 5:

1. The host device 1010-1 checks its ARP cache to find the MAC address (MAC_1) for IP address IP_1 associated with the client device 1005-1.

2. The host device 1010-1 sends a TCP synchronize (SYN) message with MAC_1 as the destination MAC address and IP_1 as the destination IP address.

3. The network switches 1003 look up the destination MAC address (MAC_1) in a switch MAC table, to find the port of the network switches 1003 associated with that destination MAC address. In this case, the port is PORT_1. The network switches 1003 then forwards a packet (e.g., TCP SYN) to the client device 1005-1 via PORT_1.

4. The client device 1005-1 receives the TCP SYN, and then sends a TCP SYN acknowledgement (TCP SYN ACK or TCP SYN/ACK) back to the network switches 1003. The TCP SYN/ACK has AggrMAC as the destination MAC address and VIRTUAL_IP as the destination IP address.

5. The network switches 1003 will look up the port for the destination MAC address for the TCP SYN/ACK, Aggr-MAC. In this case, the port is Port Channel 1. For Port Channel 1, network switches 1003 utilize a distribution algorithm for the MLAG 1020 to select a particular link to forward the TCP SYN/ACK to. The distribution algorithm may select the link randomly or in accordance with any desired load balancing algorithm, which does not guarantee that the TCP SYN/ACK will be forwarded to the host device 1010-1 which sent the original TCP SYN request. In this example, the link for host device 1010-h is selected. Since the host device 1010-h did not send the original TCP SYN request, a TCP connection cannot be established.

Various standards may govern Link Aggregation procedures, including the Institute of Electrical and Electronics Engineers (IEEE) 802.3ad and 802.1AX standards. Section 43.2.4 "Frame Distributor" of IEEE 802.3ad-2000 provides in part as follows:

The standard does not mandate any particular distribution algorithm(s); however, any distribution algorithm shall ensure that, when frames are received by a Frame Collector, the algorithm shall not cause:
 a) Mis-ordering of frames that are part of any given conversation, or
 b) Duplication of frames.

The above requirement of maintaining frame ordering is met by ensuring that all frames that compose a given conversation are transmitted on a single link in the order that they are generated by the MAC Client.

Conversation:
 A set of MAC frames transmitted from one end station to another, where all of the MAC frames form an ordered sequence, and where the communicating end stations require the ordering to be maintained among the set of MAC frames exchanged. (See IEEE 802.3 Clause 43.)

Section 43A.2 "Port Selection" of IEEE 802.3ad-2000 provides in part as follows:

A distribution algorithm selects the port used to transmit a given frame, such that the same port will be chosen for subsequent frames that form part of the same conversation. The algorithm may make use of information carried in the frame in order to make its decision, in combination with other information associated with the frame, such as its reception port in the case of a MAC Bridge.

The algorithm may assign one or more conversations to the same port, however, it must not allocate some of the frames of a given conversation to one port and the remainder to different ports. The information used to assign conversations to ports could include the following:
 a) Source MAC address
 b) Destination MAC address
 c) The reception port
 d) The type of destination address (individual or group MAC address)
 e) Ethernet Length/Type value (i.e., protocol identification)
 f) Higher layer protocol information (e.g., addressing and protocol identification information from the LLC sublayer or above)
 g) Combinations of the above Section B.1 "Introduction" of IEEE 802.1AX-2020 provides in part as follows:

The specification of the Frame Collection and Frame Distribution functions was defined with the following considerations in mind:
 a) Frame duplication is not permitted.

A simple Frame Collection function has been specified. The Frame Collector preserves the order of frames received on a given link, but does not preserve frame ordering among links. The Frame Distribution function maintains frame ordering by
 g) Transmitting frames of a given conversation on a single link at any time.

Conversation: A set of frames transmitted from one end station to another, with the assumption that the communicating end stations require intermediate systems to maintain the ordering of those frames. (IEEE std 802.1AX Section 3)

Section B.2 "Port Selection" of IEEE 802.1AX-2020 provides in part as follows:

A distribution algorithm selects the Aggregation Port used to transmit a given frame, such that the same Aggregation Port will be chosen for subsequent frames that form part of the same conversation. The algorithm can make use of information carried in the frame in order to make its decision, in combination with other information associated with the frame, such as its reception Aggregation Port in the case of a Bridge.

The algorithm can assign one or more conversations to the same Aggregation Port; however, it has to not allocate some of the frames of a given conversation to one Aggregation Port and the remainder to different Aggregation Ports. The information used to assign conversations to Aggregation Ports could include (but is not limited to) the following:
 a) Source MAC address
 b) Destination MAC address
 c) Reception Aggregation Port
 d) Type of destination address (individual or group MAC address)
 e) Ethernet Length/Type value (i.e., protocol identification)
 f) VLAN Identifier
 g) Higher layer protocol information (e.g., addressing and protocol identification information from the LLC sublayer or above)
 h) Combinations of the above Section 6.6 "Conversation-Sensitive Collection and Distribution" of IEEE 802.1AX-2020 provides in part as follows:

Conversation-Sensitive Collection and Distribution (CSCD) allows administrative control of the Frame Distributor's selection of the Aggregation Link for each frame and allows the Collector to accept frames received only on the expected Aggregation Link.

6.6.1 Port Algorithms and Port Conversation IDs

A Port Algorithm specifies how each frame (i.e., service requests from the Aggregator Port and service indications from the Aggregation Port) is associated with a Port Conversation ID taking a value between 0 and 4095. In particular the algorithm specifies how the contents of one or more fields in the frame are used to determine the Port Conversation ID.

Both the IEEE 802.3ad and 802.1AX standards have the same requirement—duplication and mis-ordering of frames is not allowed. According to these standards, a distribution algorithm selects the Aggregation Port used to transmit a given frame, such that the same Aggregation Port will be chosen for subsequent frames that form part of the same conversation. In the IEEE 802.3ad standard, the distribution algorithm distributes frames of a specific conversation to a specific physical port. In the IEEE 802.1AX standard, CSCD is introduced, which allows administrative control of the frame distributor's selection of the aggregation link. A Port Algorithm specifies how each frame is associated with a Port Conversation ID, instead of a physical aggregation port. The Port Conversation ID and preferred link relationship may be defined in a standard-defined structure (e.g., Admin_Conv_Link_Map). Details of CSCD are described in Section 6.6 of the IEEE 802.1AX standard.

The IEEE 802.3ad and 802.1AX standards do not specify how to implement the port selection algorithm-any implementation which follows the standard requirements (e.g., no mis-ordering and no duplication) should be fine. Of course, if the workload could be distributed more evenly among aggregation ports, the port selection algorithm has better performance. The technical solutions described herein provide a customization of the port selection algorithm on the network switch side, which solves the above-noted technical problems associated with server-initiated conversations.

Implementations of a port selection algorithm include:
Layer2:
hash=source MAC XOR destination MAC XOR packet type ID
slave number=hash modulo slave count
Layer2+3:
hash=source MAC XOR destination MAC XOR packet type ID
hash=hash XOR source IP XOR destination IP
hash=hash XOR (hash RSHIFT 16)
hash=hash XOR (hash RSHIFT 8)
And then hash is reduced modulo slave count.
Layer3+4:
hash=source port, destination port (as in the header)
hash=hash XOR source IP XOR destination IP
hash=hash XOR (hash RSHIFT 16)
hash=hash XOR (hash RSHIFT 8)
And then hash is reduced modulo slave count.

For client-initiated conversations (e.g., a TCP session), an aggregator on the network switch side will distribute frames of a given TCP session to the same aggregation port (e.g., as per the IEEE 802.3ad standard) or an administrative expected aggregation port with the support of CSCD (e.g., as per the IEEE 802.1AX standard).

Figure 11:
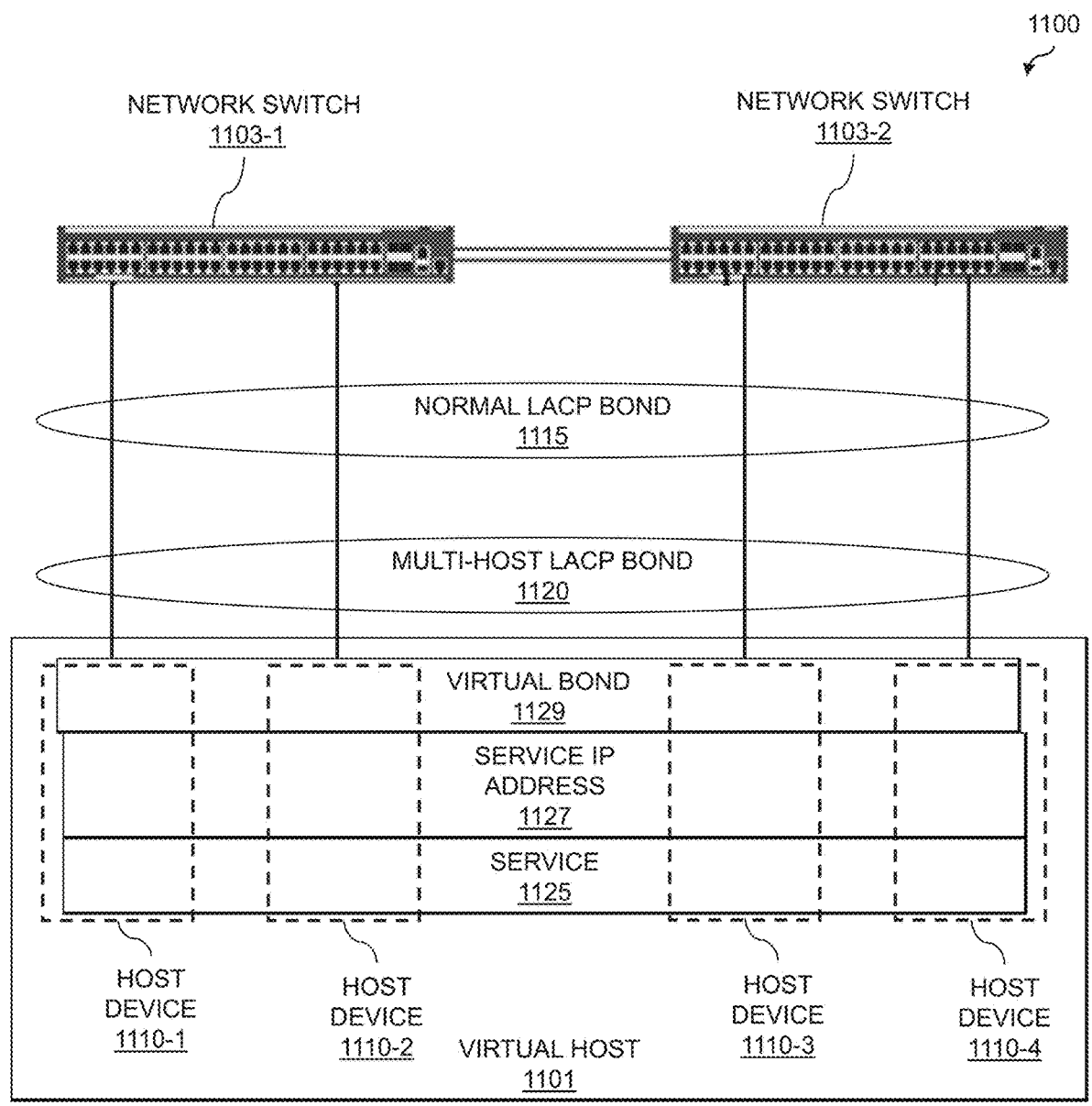
FIG. 11 shows a service and associated service Internet Protocol address and virtual bond provided by a cluster of host devices which are part of a multi-host link aggregation bond in an illustrative embodiment.

FIG. 11 shows a system 1100 implementing the Multi-Host Link Aggregation approach. The system 1100 includes a cluster shown as a virtual host 1101 with a plurality of host devices 1110-1, 1110-2, 1110-3 and 1110-4 (collectively, host devices 1110) shown in dashed outline. Although not shown, each of the host devices 1110 is assumed to implement a MH-LAG agent as described above with respect to FIGS. 6-9. The host devices 1110 are in communication with network switches 1103-1 and 1103-2 (collectively, network switches 1103). The Multi-Host Link Aggregation approach builds a multi-host LACP bond 1120 for the host devices 1110. The multi-host LACP bond 1120 is viewed as a normal LACP bond 1115 by peer ports on the network switches 1103. The host devices 1110 are assumed to implement a service 1125 associated with a service IP address 1127 that is shared across the host devices 1110, and thus provides a virtual bond 1129.

Figure 12:
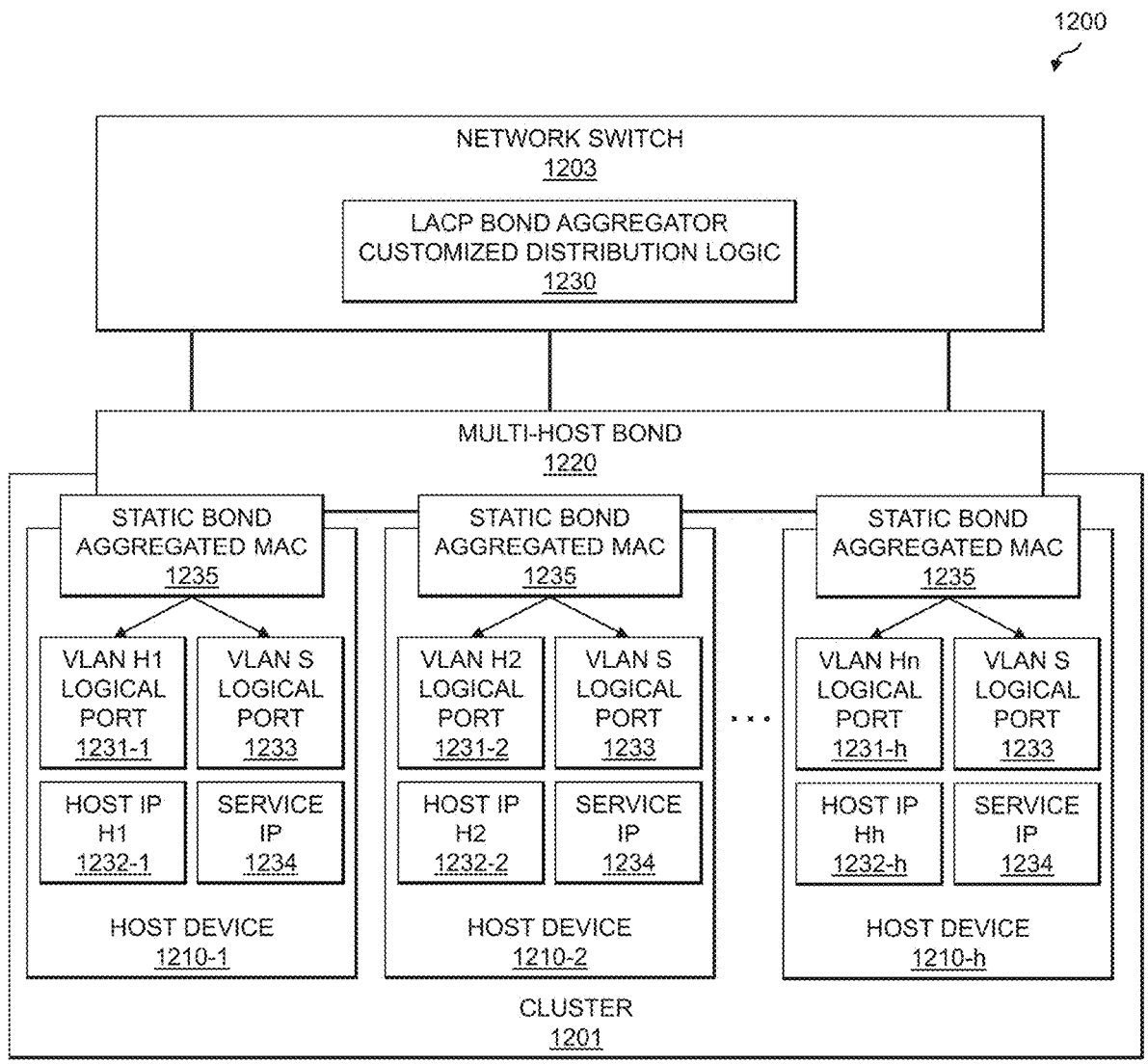
FIG. 12 shows a system including a network switch configured with a customized link distribution algorithm for distributing network frames among a cluster of host devices which are part of a multi-host link aggregation bond with each of the host devices in the cluster being configured with a first virtual local area network logical device for server-initiated communications and a second virtual local area network logical device for client-initiated conversations in an illustrative embodiment.

FIG. 12 shows a system 1200 implementing the Multi-Host Link aggregation approach. The system 1200 includes a cluster 1201 comprising a plurality of host devices 1210-1, 1210-2 . . . 1210-h (collectively, host devices 1210). Although not shown, each of the host devices 1210 is assumed to implement a MH-LAG agent as described above with respect to FIGS. 6-9. The host devices 1210 are in communication with a network switch 1203. The Multi-Host Link Aggregation approach builds a multi-host bond 1220 (e.g., a multi-host LACP bond) for the host devices 1210. The multi-host bond 1220 is viewed as a normal LACP bond by peer ports on the network switch 1203. Each of the host devices 1210-1, 1210-2 . . . 1210-h is associated with a host IP address H1 1232-1, H2 1232-2 . . . . Hh 1232-h (collectively, host IP addresses 1232) and a service IP address 1234. The host devices 1210-1, 1210-2 . . . 1210-h also create respective VLAN logical devices associated with VLAN H1 logical port 1231-1, VLAN H2 logical port 1231-2 . . . . VLAN Hh logical port 1231-h (collectively, VLAN host logical ports 1231) and a VLAN service(S) logical port 1233. The VLAN logical devices are associated with a static bond device on each of the host devices 1210, shown as static bond aggregated MAC 1235. Each of the static bond devices is associated with a unique VLAN host logical port (e.g., one of the VLAN host logical ports 1231) and a same VLAN service logical port (e.g., VLAN S logical port 1233). The VLAN host logical ports 1231 are associated with host VLAN tags (VLAN_H1, VLAN_H2, . . . . VLAN_Hh) which are different for each of the host devices 1210 in the cluster 1201, and which are used for server-initiated conversations. The VLAN S logical port 1233 is for a service VLAN device used for client-initiated conversations, and has the same service VLAN tag (VLAN_S) for all of the host devices 1210 in the cluster 1201. The host devices 1210 are configured with different host IP addresses 1232 (e.g., IP_H1, IP_H2, . . . . IP_Hh), with the host IP addresses 1232 being configured on the host VLAN logical devices. The host IP addresses 1232 are planned for use in server-initiated conversations only (e.g., communications initiated by the host devices 1210). The host devices 1210 are also each configured with the same service IP address 1234. The service IP address 1234 is configured for the service VLAN logical device. The service IP address 1234 is planned for use in client-initiated conversations only. The network switch 1203 implements LACP bond aggregator customized distribution logic 1230, which is configured to handle distribution of communications for both client-initiated conversations and server-initiated conversations. FIG. 13 shows pseudocode 1300 for a customized distribution algorithm implemented by the LACP bond aggregator customized distribution logic 1230 of the network switch 1203.

Figure 14A:
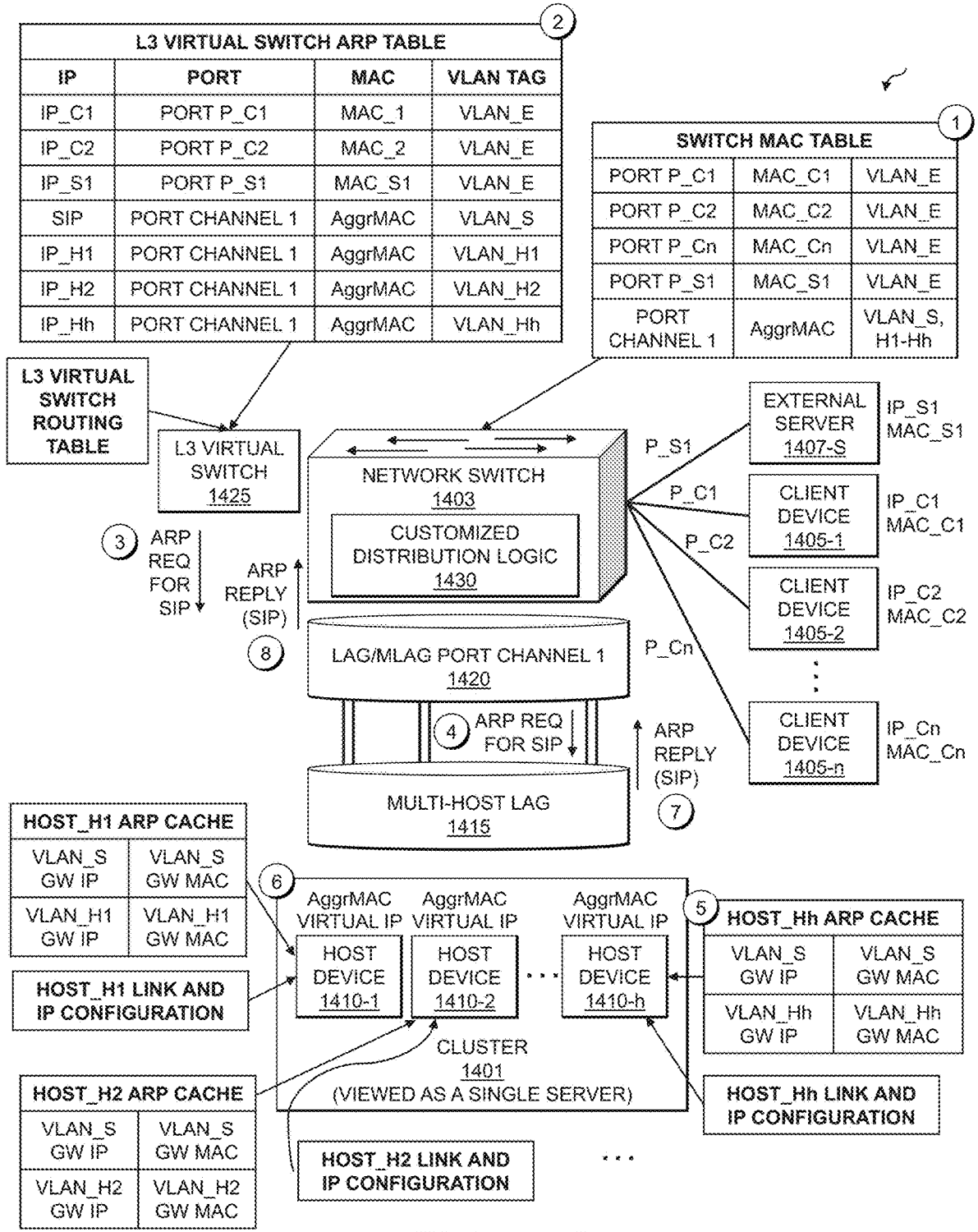

FIGS. 14A and 14B show a system 1400. As shown in FIG. 14A, the system 1400 includes a cluster 1401 comprising a plurality of host devices 1410-1, 1410-2, . . . 1410-h (collectively, host devices 1410) which are associated with a same AggrMAC and virtual IP address for a multi-host LAG 1415. The host devices 1410 are associated with respective host ARP cache and host link and IP configuration tables. The host link and IP configuration tables are shown in FIG. 14B. The system 1400 also includes a LAG or MLAG port channel 1 1420, a network switch 1403, and an L3 virtual switch 1425. The network switch 1403 implements customized distribution logic 1430, and is associated with a switch MAC table showing ports and associated MAC addresses and VLAN tags. The L3 virtual switch 1425 is associated with an L3 virtual switch routing table and an L3 virtual switch ARP table. The L3 virtual switch ARP table shows IP addresses and associated ports, MAC addresses and VLAN tags. The network switch 1403 is associated with a switch MAC table showing ports and associated MAC addresses and VLAN tags. The system 1400 also includes a plurality of client devices 1405-1, 1405-2 . . . 1405-$n$ (collectively, client devices 1405) and an external server 1407-S. The client devices 1405-1, 1405-2 . . . 1405-$n$ are associated with respective client IP addresses IP_C1, IP_C2 . . . . IP_Cn and MAC addresses MAC_C1, MAC_C2 . . . . MAC_Cn. The external server 1407-S is associated with IP address IP_S1 and MAC address MAC_S1.

For case of illustration, it is assumed that all of the client devices 1405 and the external server 1407-S are located in one VLAN with VLAN tag E. A service IP address, SIP, belongs to a service VLAN logical device with tag VLAN_S, and host IP addresses IP_H1, IP_H2, . . . . IP_Hh of the host devices 1410 belong to host VLAN logical devices with respective VLAN tags VLAN_H1, VLAN_H2 . . . . VLAN_Hh. The LACP bond (e.g., multi-host LAG 1415) is a layer 1/layer 2 (L1/L2) concept, but since the service IP address SIP, the host IP addresses IP_H1. IP_H2 . . . . IP_Hh, the client device IP addresses IP_1. IP_2 . . . . IP_n, and external server IP address IP_S1 may belong to different VLANs, there is a need to describe how client-initiated and server-initiated conversations may be established and maintained with a VLAN gateway (e.g., L3 virtual switch 1425) in the middle. Details of layer 3 (L3) forwarding are outside the scope of the technical solutions described herein. A TCP session is used as an example of a server-initiated conversation.

When configuring the MLAG Port Channel 1 1420 on the network switch 1403 side, a customized "VLAN_PORT_CONV_MAP" is configured. All host VLAN IDs are added to the VLAN_PORT_CONV_MAP. According to a customized distribution algorithm (e.g., pseudocode 1300 of FIG. 13) implemented by the customized distribution logic 1430, if a network frame has a VLAN ID in the VLAN_PORT_CONV_MAP, the customized distribution algorithm will return the VLAN ID as the port conversation ID directly. Otherwise, depending on an xmit_hash_policy, the customized distribution algorithm will generate a port conversation ID based on a hash of any desired combination of source and destination MAC addresses, source and destination IP addresses, source and destination ports, etc. At last, the mapping of the port conversation ID to an aggregation link ID (e.g., defined in Chapter 6.6 of the IEEE 802.1AX standard) should be configured in a standard-defined structure "ADMIN_CONV_LINK_MAP" (e.g., mapping portion conversation ID H1 to link 1 with host device 1410-1, mapping port conversation ID H2 to link 2 with host device 1410-2 . . . mapping port conversation ID Hh to link h with host device 1410-$h$). As per this configuration, the network switch 1403 will always distribute network frames with the VLAN tag VLAN_H1 to link 1 associated with the host device 1410-1, network frames with the VLAN tag VLAN_H2 to link 2 associated with the host device 1410-2 . . . network frames with the VLAn tag VLAN_Hh to link h associated with the host device 1410-$h$.

FIG. 14A shows a process flow which may be performed before a TCP session is established, where the L3 virtual switch 1425 uses a gateway (GW) request to get service IP and MAC addresses, as well as the host local IP and MAC addresses for the host devices 1410 in the cluster 1401, and vice versa. The host devices 1410 are connected via the multi-host LAG 1415 on the host or cluster side, and with an LACP bond of the network switch 1403 on the switch side (where the network switch 1403 implements the customized distribution logic 1430, such as the algorithm shown in the pseudocode 1300 of FIG. 13). Since the SIP address is planned for use in client-initiated conversation only, the ARP request is described from the GW (e.g., L3 virtual switch 1425/network switch 1403) side only. This ARP request, however will lead to ARP neighbor updates on both sides (e.g., in the L3 virtual switch ARP table, in the host_H1 through host_Hh ARP caches, etc.). Steps 1-8 of the process flow in FIG. 14A will now be described:

1. The network switch 1403 has built its switch MAC table based on Gratuitous ARP (GARP) sent by endpoints which are direct attached to the network switch 1403.
2. A VLAN L3 forwarding request causes the L3 virtual switch 1425 to maintain the L3 virtual switch ARP table or a similar data structure. If the L3 virtual switch 1425 needs to forward a packet with a destination IP address not in the L3 virtual switch ARP table, an ARP request for the destination IP address (e.g., the SIP address) will be sent. For the ARP request, the source IP address would be the VLAN_S GW IP address and the source MAC should be the VLAN_S GW MAC address.
3. An ARP request for the SIP address is a broadcast frame including the VLAN_S tag. For Aggregator MLAG Port Channel 1 1420, which is directly connected with the multi-host LAG 1415 on the cluster 1401 side, the customized distribution logic 1430 will check if the VLAN_S tag is in "VLAN_PORT_CONV_MAP." If not, it will use an xmit_hash_policy supported by the network switch 1403 (e.g., Layer2, Layer2+3, Layer3+4, etc. as described above). The SIP address VLAN_S tag should not be configured in "VLAN_PORT_CONV_MAP," so the ARP request could be distributed to any link in the bond according to the xmit_hash_policy.
4. The ARP request, according to the xmit_hash_policy, is assumed to be distributed to link h in the multi-host LAG 1415 for host device 1410-$h$.
5. The host device 1410-$h$ receives the ARP request for the SIP address and, since it has the SIP address configured on a network device with the MAC address AggrMAC, the host device 1410-$h$ will update an entry (e.g., VLAN_S GW IP: VLAN_S GW MAC) to the host_Hh ARP cache.
6. An MH-LAG agent (not shown) running on the host device 1410-$h$ will detect that the host_Hh ARP cache was updated, and will sync with all MH-LAG agents running on other ones of the host devices 1410 in the cluster 1401 to sync their ARP caches (e.g., the host_H1 and host_H2 ARP caches will both be updated with the VLAN_S GW IP: VLAN_S GW MAC entry).
7. The host device 1410-$h$ will send an ARP reply request with information that the SIP address is on AggrMAC via a host h local bond. For the ARP reply, the destination IP address should be the VLAN_S GW IP address and the destination MAC address should be the VLAN_S GW MAC address. On the network switch 1403 side, the ARP reply will be forwarded to the L3 virtual switch 1425 as normal.
8. The L3 virtual switch 1425 will update the L3 virtual switch ARP table accordingly based on the ARP reply.

Figure 15:
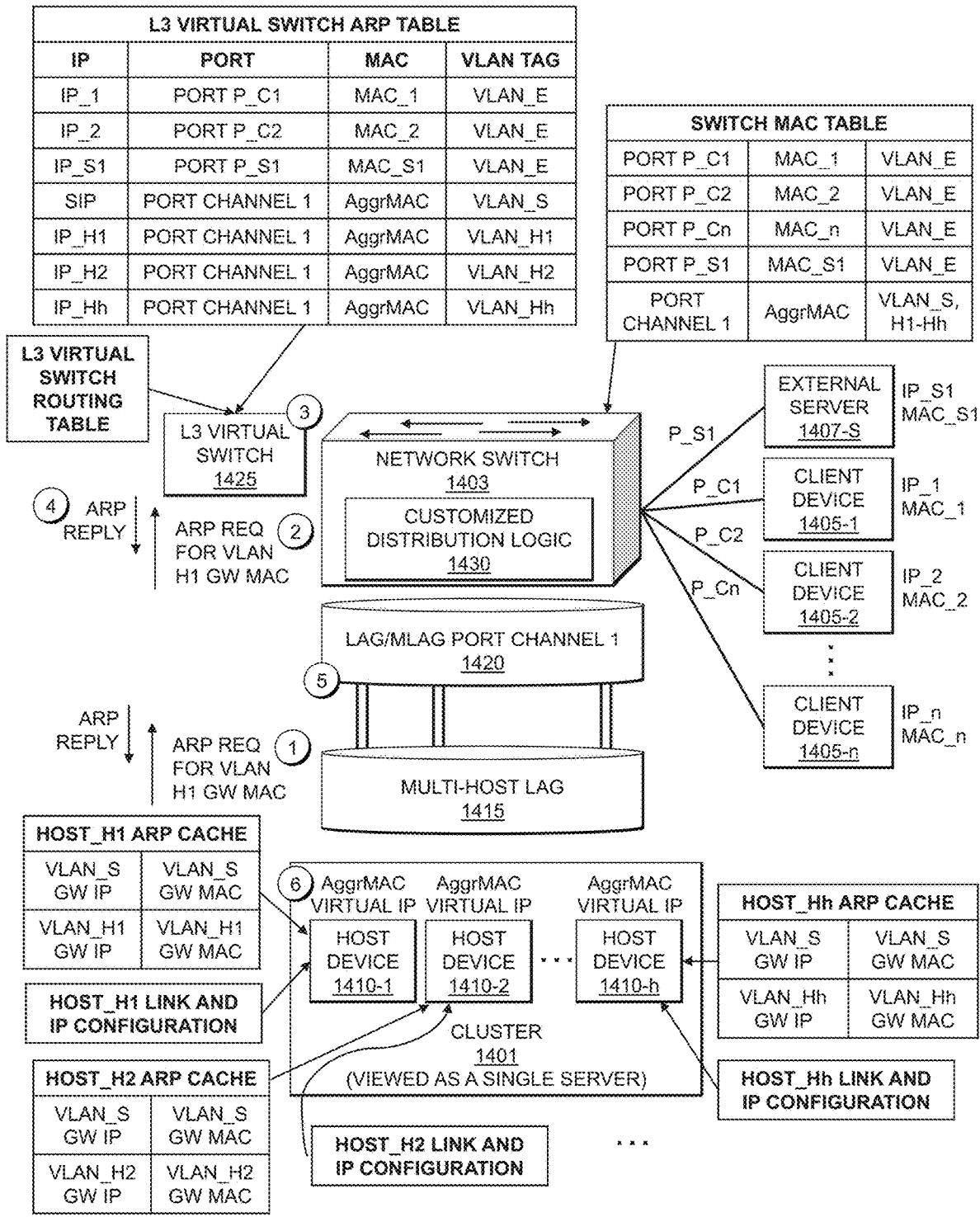
FIG. 15 shows a process flow for building neighbor relationships between a virtual local area network logical device host gateway and a host Internet Protocol address in a system including a cluster of host devices which are part of a multi-host link aggregation bond in an illustrative embodiment.

FIG. 15 shows another view of the system 1400, illustrating a process flow for building neighbor relationships between the VLAN host GW and the host IP addresses. VLANs for the host devices 1410 and host IP addresses are planned for use with server-initiated conversations, such as where software running on the host devices 1410 initiates conversations with an external server such as external server 1407-S. For example, the external server 1407-S may be an AD server, and LDAP server, a Kerberos server for authentication/authorization, a Network Time Protocol (NTP)

server for time synchronization, etc. The process flow shown in FIG. 15 describes an ARP request from the host side only, and includes steps 1-6:

1. Software on host device 1410-1 needs to initiate a conversation to the external server 1407-S with IP address IP_S1 via host IP address IP_H1. It finds that IP_H1 and IP_S1 belong to different subnets, and so it needs to send the outbound packet to the IP_H1's gateway. First, the host device 1410-1 should send an ARP request to get the MAC address of the host device 1410-1 IP_H1 gateway MAC. The ARP request is broadcast, with a destination IP address of the VLAN_H1 GW IP, the source MAC address of Aggr-MAC, and the source IP address of IP_H1. The frame should be tagged with VLAN_H1, and the ARP request will be sent to the host device 1410-1's local link.
2. The network switch 1403 will forward the ARP request to the L3 virtual switch 1425.
3. The L3 virtual switch 1425 will update the L3 virtual switch ARP table with IP_H1: AggrMAC and VLAN tag VLAN_H1.
4. The L3 virtual switch 1425 sends an ARP reply with information that VLAN_H1 GW IP is on VLAN_H1 GW MAC. The ARP reply frame uses a destination IP address IP_H1 and a destination MAC address of AgrMAC. The ARP reply frame will be tagged with the VLAN_H1 tag.
5. The network switch 1403 will use the customized distribution logic 1430 to check if the ARP reply has a VLAN tag and, if so, will check if the VLAN tag is in "VLAN_PORT_CONV_MAP." For this case, the VLAN_H1 tag should be in the "VLAN_PORT_CONV_MAP." According to the customized distribution logic 1430 (e.g., the pseudocode 1300 of FIG. 13), the network switch 1403 will distribute the ARP reply to link 1 connected to the host device 1410-1.
6. Upon receiving the ARP reply, the host device 1410-1 will update the host_H1 ARP cache with an entry VLAN_H1 GW IP: VLAN_H1 GW MAC. This host VLAN GW in the host_H1 ARP cache will not be synchronized by the MH-LAG agents running on the host devices 1410, as it is specific to the host device 1410-1 only.

Figure 16:
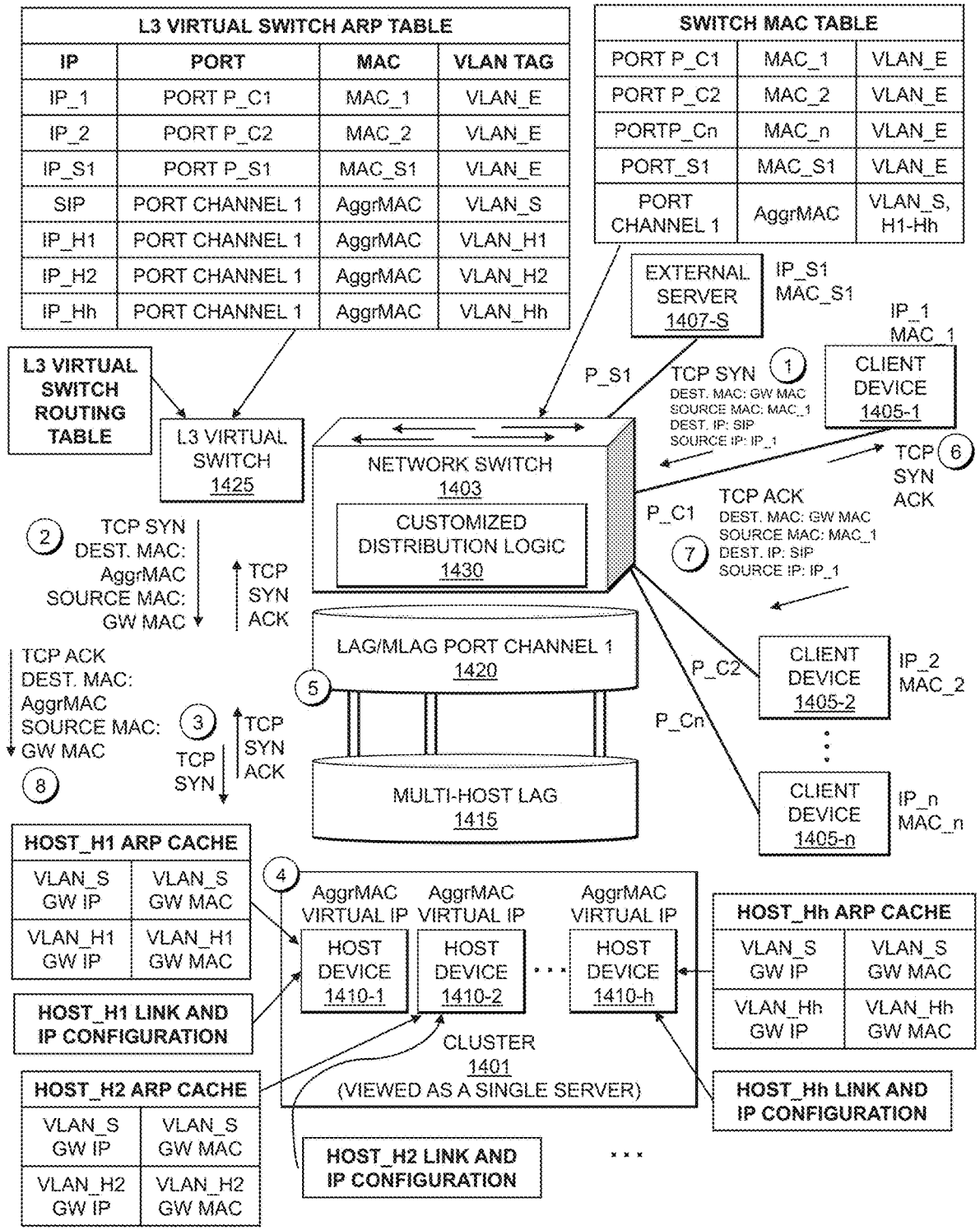
FIG. 16 shows a process flow for a client-initiated conversation to a service Internet Protocol address in a system including a cluster of host devices which are part of a multi-host link aggregation bond in an illustrative embodiment.

FIG. 16 shows another view of the system 1400, illustrating a process flow for initiating a TCP session from the client side to the SIP address. The process flow shown in FIG. 16 includes steps 1-8:

1. Client device 1405-1 sends a TCP SYN to the SIP address. The TCP SYN has a destination MAC address of GW MAC, a source IP address of MAC_1, a destination IP address of SIP, and a source IP address of IP_1.
2. Since the client device 1405-1's IP address IP_1 and the SIP address belong to different subnets/VLANs, L3 forwarding will be triggered. The L3 virtual switch 1425 will forward the TCP SYN to Port Channel 1, with the source MAC address changed to GW_MAC, the destination MAC address changed to AggrMAC, and the VLAN tag set to VLAN_S.
3. The customized distribution logic 1430 of the network switch 1403 will, for the Port Channel 1 aggregator, check if the frame's VLAN tag is in "VLAN_PORT_CONV_MAP." For this case, VLAN_S should not be in "VLAN_PORT_CONV_MAP." Thus, the customized distribution logic 1430 (e.g., the pseudocode 1300 of FIG. 13) will distribute the frame based on the xmit_hash_policy. In this example, based on the combination of MAC, IP and port values, the packet is assumed to be distributed to link 1 associated with host device 1410-1.
4. The host device 1410-1 receives the TCP SYN request, and replies with a TCP SYN ACK including a destination MAC address of GW MAC and a destination IP address of IP_1 via the host device 1410-1's local link.
5. Since there is no change on the frame collector on the network switch 1403 side, the network switch 1403 will work as normal and L3 forwarding will be triggered. The network switch 1403 will forward the TCP SYN ACK to port P_C1 associated with the client device 1405-1 based on the ARP table.
6. The client device 1405-1 receives the TCP SYN ACK.
7. The client device 1405-1 sends out a TCP ACK to the service IP address SIP. The TCP ACK has a destination MAC address of GW MAC, a source MAC address of MAC_1, a destination IP address of SIP, and a source IP address of IP_1.
8. The network switch 1403 will use the customized distribution logic 1430 to distribute the TCP ACK to the same link as the TCP SYN in step 3, since they belong to the same conversation (e.g., they have the same source and destination MAC addresses, the same source and destination IP addresses, and the same source and destination ports). Thus, the TCP ACK is distributed to link 1 associated with host device 1410-1.

Consecutive TCP packets sent by the client device 1405-1 within the same TCP session should be distributed to the same link (which in the FIG. 16 process flow example, is the link 1 associated with the host device 1410-1) by the switch aggregator. Thus, the TCP session is established and maintained.

Figure 17:
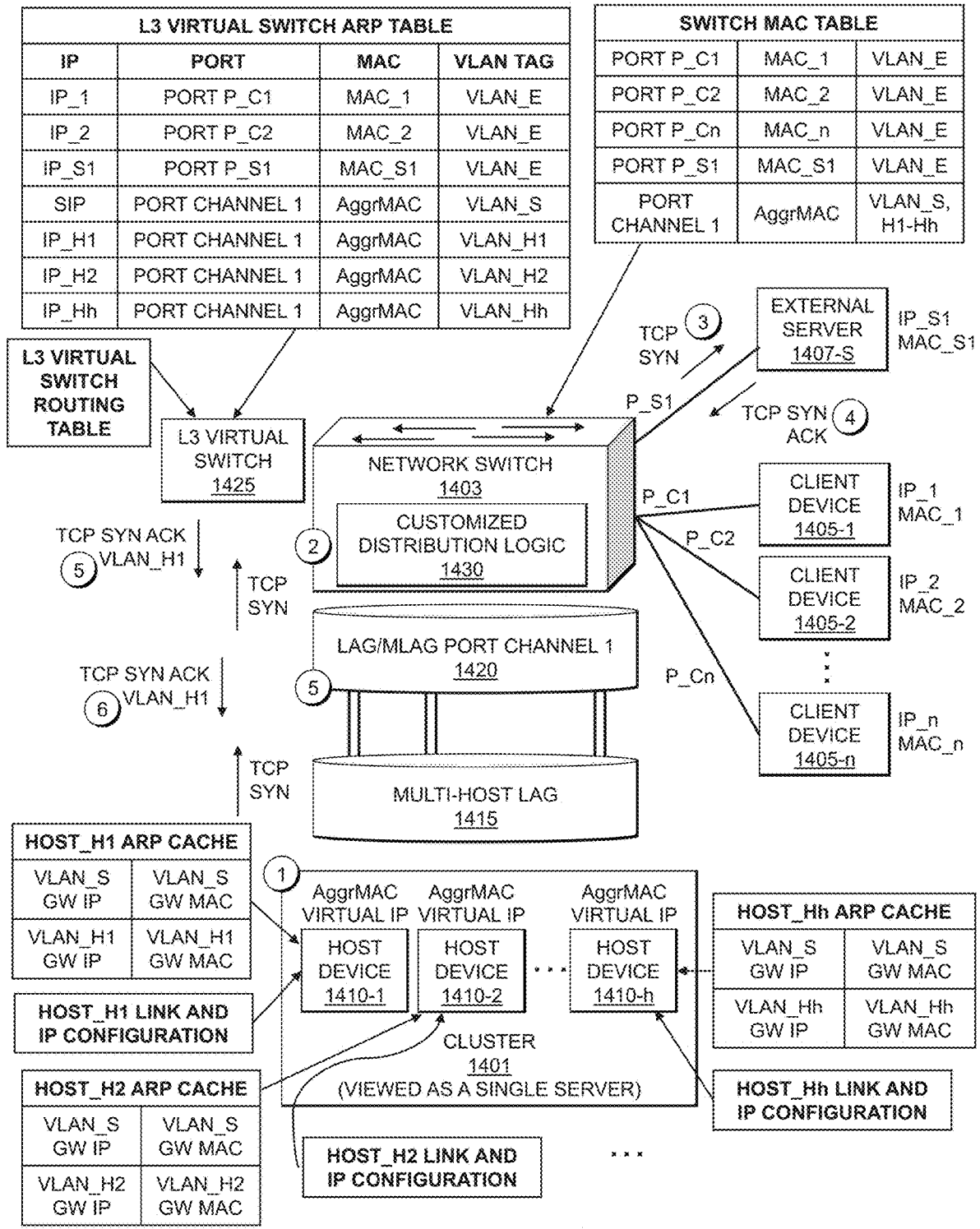
FIG. 17 shows a process flow for a server-initiated conversation from a host device in a system including a cluster of host devices which are part of a multi-host link aggregation bond in an illustrative embodiment.

So far, this approach handles client-initiated conversations well. A process flow for how host devices 1410 in the cluster 1401 may initiate conversations to the external server 1407-S successfully will now be described with respect to FIG. 17. FIG. 17 shows another view of the system 1400, illustrating a process flow for initiating a TCP session from the host side. The process flow shown in FIG. 17 includes steps 1-6:

1. The host device 1410-1 with host IP address IP_H1 in VLAN_H1 needs to initiate a conversation with the external server 1407-S having IP address IP_S1 in VLAN_E. The host device 1410-1 finds that the destination IP address, IP_S1, is in a different subnet compared with the host IP address IP_H1, and thus the host device 1410-1 sends a TCP SYN with IP_S1 as the destination IP address and the first hop GW MAC as the destination MAC address to the host device 1410-1's host local link.
2. Since there is no change on the frame collector on the switch side, the network switch 1403 will work as normal and L3 forwarding will be triggered. The network switch 1403 will forward the TCP SYN request to port P_S1 based on its ARP table.
3. The external server 1407-S receives the TCP SYN frame from the host device 1410-1.
4. The external server 1407-S sends a TCP SYN ACK frame to the host IP address IP_H1. Since IP_H1 and IP_S1 are in different subnets, the external server 1407-S will send the TCP SYN ACK frame to the VLAN_E GW for forwarding, with the VLAN tag changed to VLAN_H1.
5. Switch L3 forwarding is triggered, and the network switch 1403 will change the TCP SYN ACK frame's destination MAC address to AggrMAC and will change the source MAC to VLAN_S GW.
6. The network switch 1403 will use the customized distribution logic 1430 (e.g., the pseudocode 1300 of FIG. 13) on the Port Channel 1 aggregator to check if the frame's VLAN tag is in "VLAN_PORT_CONV_MAP." For this case, VLAN_H1 should be in "VLAN_PORT_CONV_MAP." According to the configuration, the customized distribution logic 1430 will distribute the TCP SYN ACK frame to the link 1 associated with the host device 1410-1. The host device 1410-1 will reply with a TCP ACK frame via its local link, link 1. The host device 1410-1 may continue to communicate with the external server 1407-S having IP address IP_S1 since the consecutive TCP packets of this session from IP_S1 will be distributed to the link 1 associated with the host device 1410-1.

The technical solutions described herein provide enhancements for LACP bond frame distribution algorithms for load balancing. Advantageously, the technical solutions can use network switches instead of extra load balancer entities. The technical solutions further strengthen port, node and switch level redundancy in the frontend of a cluster. Compared with conventional Active/Active cluster implementations, the technical solutions described herein can remove extra entities like a load balancer/DNS entity which may be a single failure point or performance bottleneck. The enhanced frame distribution algorithms described herein also advantageously support both client-initiated and server-initiated conversations, and are thus well-suited for various cluster scenarios including sophisticated cluster scenarios.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for managing communications for host devices which are part of a multi-host link aggregation group will now be described in greater detail with reference to FIGS. 18 and 19. Although described in the context of system 100, these platforms may also be used to implement at least portions of other information processing systems in other embodiments.

Figure 18:
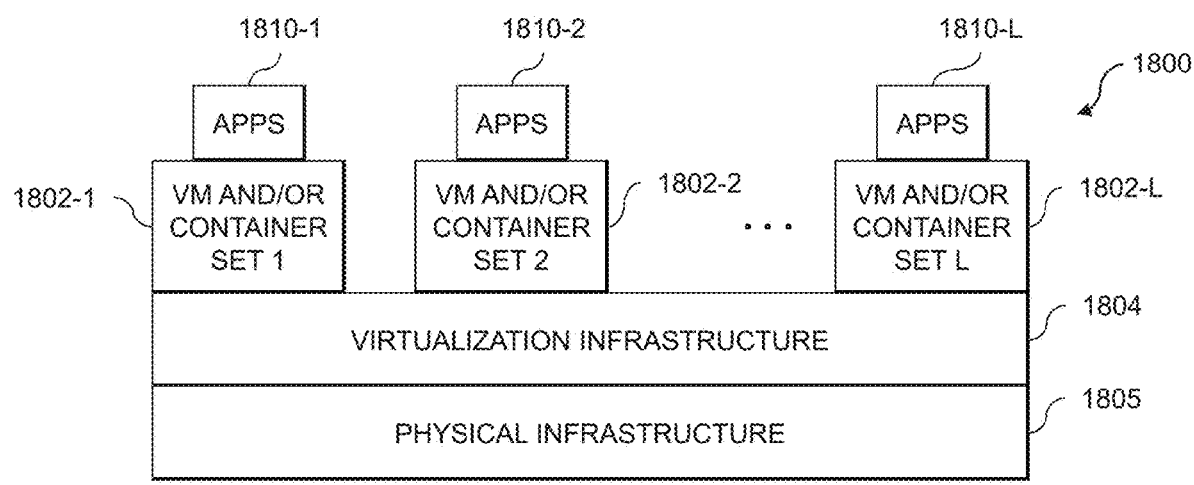
FIGS. 18 and 19 show examples of processing platforms that may be utilized to implement at least a portion of an information processing system in illustrative embodiments.
Figure 19:
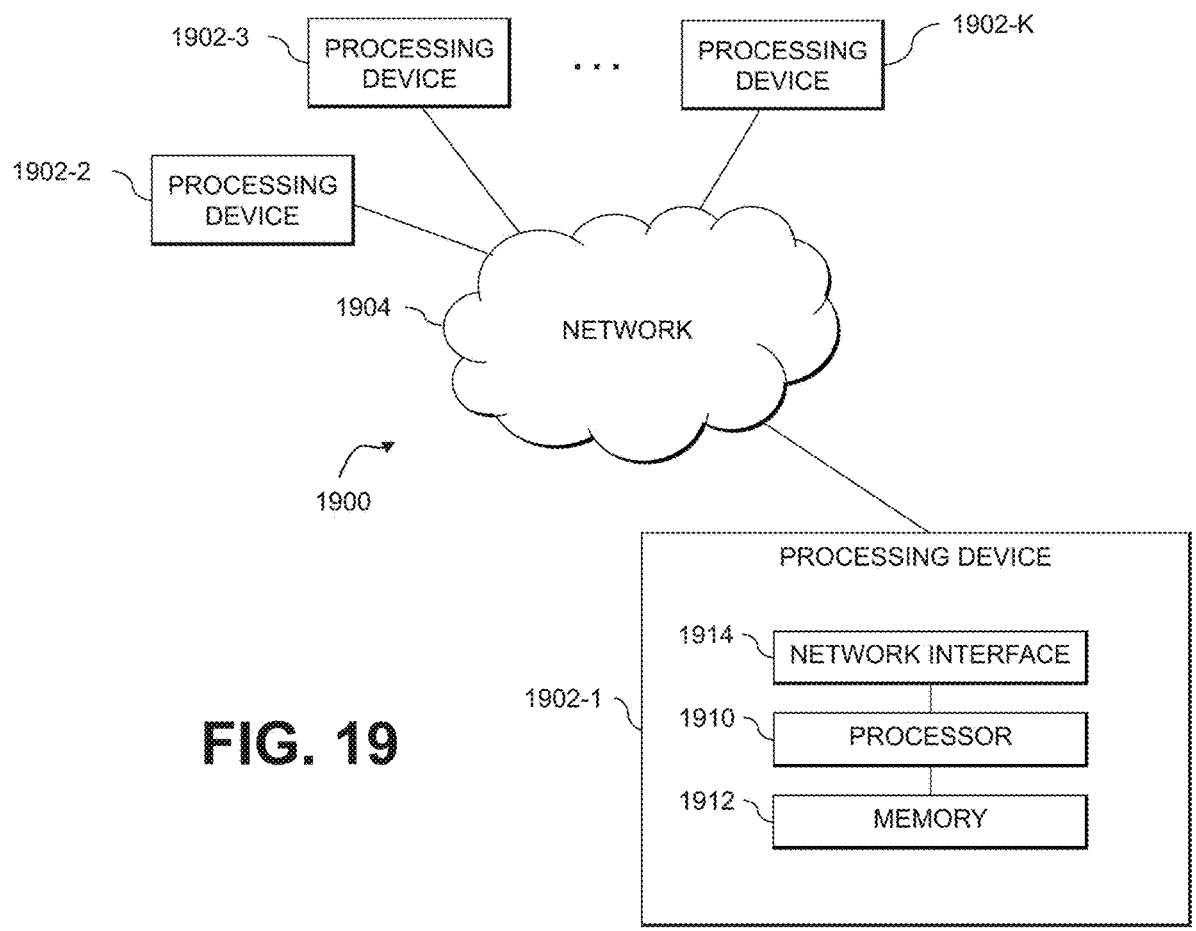

FIG. 18 shows an example processing platform comprising cloud infrastructure 1800. The cloud infrastructure 1800 comprises a combination of physical and virtual processing resources that may be utilized to implement at least a portion of the information processing system 100 in FIG. 1. The cloud infrastructure 1800 comprises multiple virtual machines (VMs) and/or container sets 1802-1, 1802-2 . . . 1802-L implemented using virtualization infrastructure 1804. The virtualization infrastructure 1804 runs on physical infrastructure 1805, and illustratively comprises one or more hypervisors and/or operating system level virtualization infrastructure. The operating system level virtualization infrastructure illustratively comprises kernel control groups of a Linux operating system or other type of operating system.

The cloud infrastructure 1800 further comprises sets of applications 1810-1, 1810-2 . . . 1810-L running on respective ones of the VMs/container sets 1802-1, 1802-2, . . . 1802-L under the control of the virtualization infrastructure 1804. The VMs/container sets 1802 may comprise respective VMs, respective sets of one or more containers, or respective sets of one or more containers running in VMs.

In some implementations of the FIG. 18 embodiment, the VMs/container sets 1802 comprise respective VMs implemented using virtualization infrastructure 1804 that comprises at least one hypervisor. A hypervisor platform may be used to implement a hypervisor within the virtualization infrastructure 1804, where the hypervisor platform has an associated virtual infrastructure management system. The underlying physical machines may comprise one or more distributed processing platforms that include one or more storage systems.

In other implementations of the FIG. 18 embodiment, the VMs/container sets 1802 comprise respective containers implemented using virtualization infrastructure 1804 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1800 shown in FIG. 18 may represent at least a portion of one processing platform. Another example of such a processing platform is processing platform 1900 shown in FIG. 19.

The processing platform 1900 in this embodiment comprises a portion of system 100 and includes a plurality of processing devices, denoted 1902-1, 1902-2, 1902-3, . . . 1902-K, which communicate with one another over a network 1904.

The network 1904 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1902-1 in the processing platform 1900 comprises a processor 1910 coupled to a memory 1912.

The processor 1910 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1912 may comprise random access memory (RAM), read-only memory (ROM), flash memory or other types of memory, in any combination. The memory 1912 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1902-1 is network interface circuitry 1914, which is used to interface the processing device with the network 1904 and other system components, and may comprise conventional transceivers.

The other processing devices 1902 of the processing platform 1900 are assumed to be configured in a manner similar to that shown for processing device 1902-1 in the figure.

Again, the particular processing platform 1900 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for managing communications for host devices which are part of a multi-host link aggregation group as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, clustered systems, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
    at least one processing device comprising a processor coupled to a memory;
    the at least one processing device being configured:
        to receive, by at least one network switch, a communication comprising a virtual logical device tag;
        to determine, at the at least one network switch, whether the virtual logical device tag is (i) a host-specific virtual logical device tag associated with a given host-specific virtual logical device of a given one of a plurality of host devices that are part of a multi-host link aggregation bond or (ii) a service-generic virtual logical device tag associated with a service-generic virtual logical device for a service provided by the plurality of host devices which are part of the multi-host link aggregation bond collectively;
        responsive to determining that the virtual logical device tag is the host-specific virtual logical device tag associated with the given host-specific virtual logical device of the given host device that is part of the multi-host link aggregation bond, to direct the communication to a given link between the at least one network switch and the given host device; and
        responsive to determining that the virtual logical device tag is the service-generic virtual logical device tag associated with the service-generic virtual logical device for the service provided by the plurality of host devices which are part of the multi-host link aggregation bond collectively, to select one of the plurality of host devices in accordance with a distribution algorithm and to direct the communication to a selected link between the at least one network switch and the selected one of the plurality of host devices.

2. The apparatus of claim 1 wherein each of the plurality of host devices comprises a static bond for a first host-specific virtual logical device associated with a host-specific network address and a second service-generic virtual logical device associated with a common service network address shared by the plurality of host devices that are part of the multi-host link aggregation bond.

3. The apparatus of claim 2 wherein the host-specific network address and the common service network address each comprise an Internet Protocol (IP) address.

4. The apparatus of claim 2 wherein the host-specific network address and the common service network address each comprise a Media Access Control (MAC) address.

5. The apparatus of claim 2 wherein the first host-specific virtual logical device and the second service-generic virtual logical device comprise virtual local area network (VLAN) logical devices.

6. The apparatus of claim 2 wherein the static bond of each of the plurality of host devices is associated with a common aggregated Media Access Control (MAC) address and a common virtual Internet Protocol (IP) address for the multi-host link aggregation bond.

7. The apparatus of claim 1 wherein the at least one network switch maintains a data structure mapping links between the at least one network switch and ones of the plurality of host devices.

8. The apparatus of claim 1 wherein the distribution algorithm comprises a load balancing distribution algorithm.

9. The apparatus of claim 8 wherein the plurality of host devices which are part of the multi-host link aggregation bond provide an active-active cluster utilizing Link Aggregation Control Protocol (LACP) bond frame distribution for performing load balancing among the plurality of host devices.

10. The apparatus of claim 1 wherein the plurality of host devices are part of a clustered system, and wherein the host-specific virtual logical device tag is used for communications initiated by respective ones of the plurality of host devices to one or more external servers outside the clustered system.

11. The apparatus of claim 10 wherein the one or more external servers comprises at least one of a network time server, an authentication server, and an authorization server.

12. The apparatus of claim 1 wherein the plurality of host devices are part of a clustered system, and wherein the service-generic virtual logical device tag is used for communications initiated by client devices for the service provided by the plurality of host devices which are part of the multi-host link aggregation bond collectively.

13. The apparatus of claim 12 wherein the clustered system comprises a clustered storage system, and wherein the service provided by the plurality of host devices which are part of the multi-host link aggregation bond collectively comprises a storage service.

14. The apparatus of claim 1 wherein each of the plurality of host devices has a single link or multiple links to the at least one network switch.

15. A computer program product comprising a non-transitory processor-readable storage medium having stored therein program code of one or more software programs, wherein the program code when executed by at least one processing device causes the at least one processing device:
to receive, by at least one network switch, a communication comprising a virtual logical device tag;
to determine, at the at least one network switch, whether the virtual logical device tag is (i) a host-specific virtual logical device tag associated with a given host-specific virtual logical device of a given one of a plurality of host devices that are part of a multi-host link aggregation bond or (ii) a service-generic virtual logical device tag associated with a service-generic virtual logical device for a service provided by the plurality of host devices which are part of the multi-host link aggregation bond collectively;
responsive to determining that the virtual logical device tag is the host-specific virtual logical device tag associated with the given host-specific virtual logical device of the given host device that is part of the multi-host link aggregation bond, to direct the communication to a given link between the at least one network switch and the given host device; and
responsive to determining that the virtual logical device tag is the service-generic virtual logical device tag associated with the service-generic virtual logical device for the service provided by the plurality of host devices which are part of the multi-host link aggregation bond collectively, to select one of the plurality of host devices in accordance with a distribution algorithm and to direct the communication to a selected link between the at least one network switch and the selected one of the plurality of host devices.

16. The computer program product of claim 15 wherein the plurality of host devices are part of a clustered system, and wherein the host-specific virtual logical device tag is used for communications initiated by respective ones of the plurality of host devices to one or more external servers outside the clustered system.

17. The computer program product of claim 15 wherein the plurality of host devices are part of a clustered system, and wherein the service-generic virtual logical device tag is used for communications initiated by client devices for the service provided by the plurality of host devices which are part of the multi-host link aggregation bond collectively.

18. A method comprising:
receiving, by at least one network switch, a communication comprising a virtual logical device tag;
determining, at the at least one network switch, whether the virtual logical device tag is (i) a host-specific virtual logical device tag associated with a given host-specific virtual logical device of a given one of a plurality of host devices that are part of a multi-host link aggregation bond or (ii) a service-generic virtual logical device tag associated with a service-generic virtual logical device for a service provided by the plurality of host devices which are part of the multi-host link aggregation bond collectively;
responsive to determining that the virtual logical device tag is the host-specific virtual logical device tag associated with the given host-specific virtual logical device of the given host device that is part of the multi-host link aggregation bond, directing the communication to a given link between the at least one network switch and the given host device; and
responsive to determining that the virtual logical device tag is the service-generic virtual logical device tag associated with the service-generic virtual logical device for the service provided by the plurality of host devices which are part of the multi-host link aggregation bond collectively, selecting one of the plurality of host devices in accordance with a distribution algorithm and directing the communication to a selected link between the at least one network switch and the selected one of the plurality of host devices;
wherein the method is performed using at least one processing device comprising a processor coupled to a memory.

19. The method of claim 18 wherein the plurality of host devices are part of a clustered system, and wherein the host-specific virtual logical device tag is used for communications initiated by respective ones of the plurality of host devices to one or more external servers outside the clustered system.

20. The method of claim 18 wherein the plurality of host devices are part of a clustered system, and wherein the service-generic virtual logical device tag is used for communications initiated by client devices for the service provided by the plurality of host devices which are part of the multi-host link aggregation bond collectively.

* * * * *